US009434067B2

(12) United States Patent
Takeda

(10) Patent No.: US 9,434,067 B2
(45) Date of Patent: Sep. 6, 2016

(54) ROBOT

(71) Applicant: FUJITSU LIMITED, Kawasaki-shi, Kanagawa (JP)

(72) Inventor: Ikuo Takeda, Kako (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/593,269

(22) Filed: Jan. 9, 2015

(65) Prior Publication Data

US 2015/0120042 A1 Apr. 30, 2015

Related U.S. Application Data

(63) Continuation of application No. PCT/JP2012/070343, filed on Aug. 9, 2012.

(51) Int. Cl.

*B25J 9/02* (2006.01)
*B25J 17/02* (2006.01)
*B25J 9/04* (2006.01)

(52) U.S. Cl.

CPC *B25J 9/02* (2013.01); *B25J 9/048* (2013.01); *B25J 17/0275* (2013.01); *Y10S 901/14* (2013.01); *Y10S 901/19* (2013.01); *Y10S 901/23* (2013.01)

(58) Field of Classification Search

CPC .............. B25J 9/02; B25J 9/04; B25J 9/048; B25J 9/06; B25J 9/046; B25J 17/0275; B25J 11/005; B25J 5/02

See application file for complete search history.

(56) References Cited

U.S. PATENT DOCUMENTS 4,590,578 A * 5/1986 Barto, Jr. ................. B21J 15/10 318/632
4,886,529 A * 12/1989 Hashimoto ............. B24B 27/04 451/14

(Continued)

FOREIGN PATENT DOCUMENTS

JP 63-174887 7/1988
JP 01-252379 10/1989

(Continued)

OTHER PUBLICATIONS

CNOA—Office Action of Chinese Patent Application No. 201280075120.7, dated Aug. 19, 2015, with partial English translation.  All references cited in the above CNOA have been submitted in the IDS filed on Jan. 9, 2015. .

(Continued)

*Primary Examiner* — David M Fenstermacher
*Assistant Examiner* — Jude Agendia
(74) *Attorney, Agent, or Firm* — Fujitsu Patent Center

(57) ABSTRACT

A robot includes a tool shaft, a first supporting mechanism attached to one portion of the tool shaft and tiltably supporting the tool shaft, a second supporting mechanism attached to a different portion of the tool shaft and tiltably supporting the tool shaft, a first in-plane movement mechanism that moves the first supporting mechanism in a first plane, a second in-plane movement mechanism that moves the second supporting mechanism in a second plane, and a controller that controls an in-plane position and an inclination angle of the tool shaft to control the first in-plane movement mechanism and the second in-plane movement mechanism. The first supporting mechanism or the second supporting mechanism supports the tool shaft movably in an axial direction.

17 Claims, 12 Drawing Sheets

(56) References Cited

U.S. PATENT DOCUMENTS

| | | | | |
|---|---|---|---|---|
| 5,279,309 | A * | 1/1994 | Taylor | A61B 19/5244 600/595 |
| 5,655,412 | A * | 8/1997 | Luik | B23K 20/123 74/490.01 |
| 5,800,423 | A * | 9/1998 | Jensen | A61B 19/22 606/1 |
| 5,916,328 | A | 6/1999 | Pritschow et al. | |
| 8,240,972 | B2 * | 8/2012 | Tokumitsu | B25J 9/042 414/744.5 |
| 2002/0133174 | A1 | 9/2002 | Charles et al. | |
| 2004/0024385 | A1 * | 2/2004 | Stuart | A61B 19/22 606/1 |
| 2005/0079042 | A1 * | 4/2005 | Maeda | B25J 9/042 414/744.2 |
| 2005/0107680 | A1 * | 5/2005 | Kopf | A61B 7/04 600/407 |
| 2005/0183532 | A1 * | 8/2005 | Najafi | A61B 8/00 74/490.01 |
| 2008/0282821 | A1 * | 11/2008 | Tokumitsu | B25J 9/042 74/29 |
| 2009/0277002 | A1 * | 11/2009 | Wada | H05K 13/0061 29/739 |
| 2010/0096090 | A1 * | 4/2010 | Yoshioka | B29C 63/0095 156/362 |
| 2010/0206120 | A1 | 8/2010 | Kinoshita et al. | |

FOREIGN PATENT DOCUMENTS

| | | |
|---|---|---|
| JP | 01-310881 | 12/1989 |
| JP | 06-092446 | 4/1994 |
| JP | 10-006159 | 1/1998 |
| JP | 10-146789 | 6/1998 |
| JP | 10-213403 | 8/1998 |
| JP | 11-77577 | 3/1999 |
| JP | 2000-126956 | 5/2000 |
| JP | 2002-530209 | 9/2002 |
| JP | 2005-028467 | 2/2005 |
| JP | 2005-066723 | 3/2005 |
| JP | 2009-012123 | 1/2009 |
| JP | 2010-184328 | 8/2010 |
| JP | 2011-230241 | 11/2011 |
| WO | 00/30557 | 6/2000 |
| WO | 2006/106165 | 10/2006 |

OTHER PUBLICATIONS

International Search Report and Written Opinion of the International Searching Authority (Form PCT/ISA/210, Form PCT/ISA/237), mailed in connection with PCT/JP2012/070343 and mailed Sep. 4, 2012. Partial English Translation (14 pages).

JPOA—Office Action of Japanese Patent Application No. 2014-529207, dated Dec. 8, 2015 , with partial English Translation. **JP2002-530209 cited in the JPOA was previously submitted in the IDS filed on Jan. 9, 2015 and considered by the Examiner on Dec. 16, 2015.

* cited by examiner 1A
1
θ
A
10H
10A'
3
10G
10D'
10B'
10E'
11E'
11D'
11B'
11A'
18
Z
Y
17
10E
11E
11D
11B
11A
10B
10D
10A
2
5X(5)
4X(4)
6
CONTROLLER 28
28
20, 21(24)
27
25A
10B
2
26
25(22A, 22)
Y
X

ROBOT

CROSS-REFERENCE TO RELATED APPLICATION

This application is a continuation application of International Application PCT/JP2012/070343 filed on Aug. 9, 2012 and designated the U.S., the entire contents of which are incorporated herein by reference.

FIELD

The embodiments discussed herein are related to a robot.

BACKGROUND

For a robot such as, for example, an industrial robot, a high-speed performance, a high degree of accuracy, a high degree of freedom, a wide range of movement and so forth are demanded.

For example, for a high-speed packing work, a parallel link robot that is superior in high-speed performance is used.

In recent years, a parallel link robot in which a posture changing mechanism having 3 degrees of freedom is provided at a tip end thereof has been developed and is utilized, for example, in an assembly work or the like.

SUMMARY

According to an aspect of the embodiment, a robot includes a tool shaft, a first supporting mechanism attached to one portion of the tool shaft and tiltably supporting the tool shaft, a second supporting mechanism attached to a different portion of the tool shaft and tiltably supporting the tool shaft, a first in-plane movement mechanism that moves the first supporting mechanism in a first plane, a second in-plane movement mechanism that moves the second supporting mechanism in a second plane, and a controller that controls an in-plane position and an inclination angle of the tool shaft to control the first in-plane movement mechanism and the second in-plane movement mechanism, and wherein the first supporting mechanism or the second supporting mechanism supports the tool shaft movably in an axial direction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Incidentally, in a conventional parallel link robot, the range of posture change is small and also the range of movement in a vertical direction is small.

Further, since the transportable weight capacity of the parallel link robot is small, the parallel link robot described above that has a posture changing mechanism having 3 degrees of freedom provided at a tip end thereof is low in rigidity. Therefore, in a work in which operating accuracy of the robot is required, for example, in a work in which apart is fitted into a concave portion, the position of the part is sometimes displaced, resulting in failure in fitting into the concave portion.

Therefore, it is desired to implement a robot that has a wide range of movement and high in rigidity.

In the following, a robot according to an embodiment is described with reference to FIGS. 1 to 7 of the drawings.

The robot according to the present embodiment is an industrial robot and is suitable for use with an assembly work for an article including comparatively small parts such as, for example, a personal computer or a portable telephone set, especially for a work in which operation accuracy is required.

Figure 1:
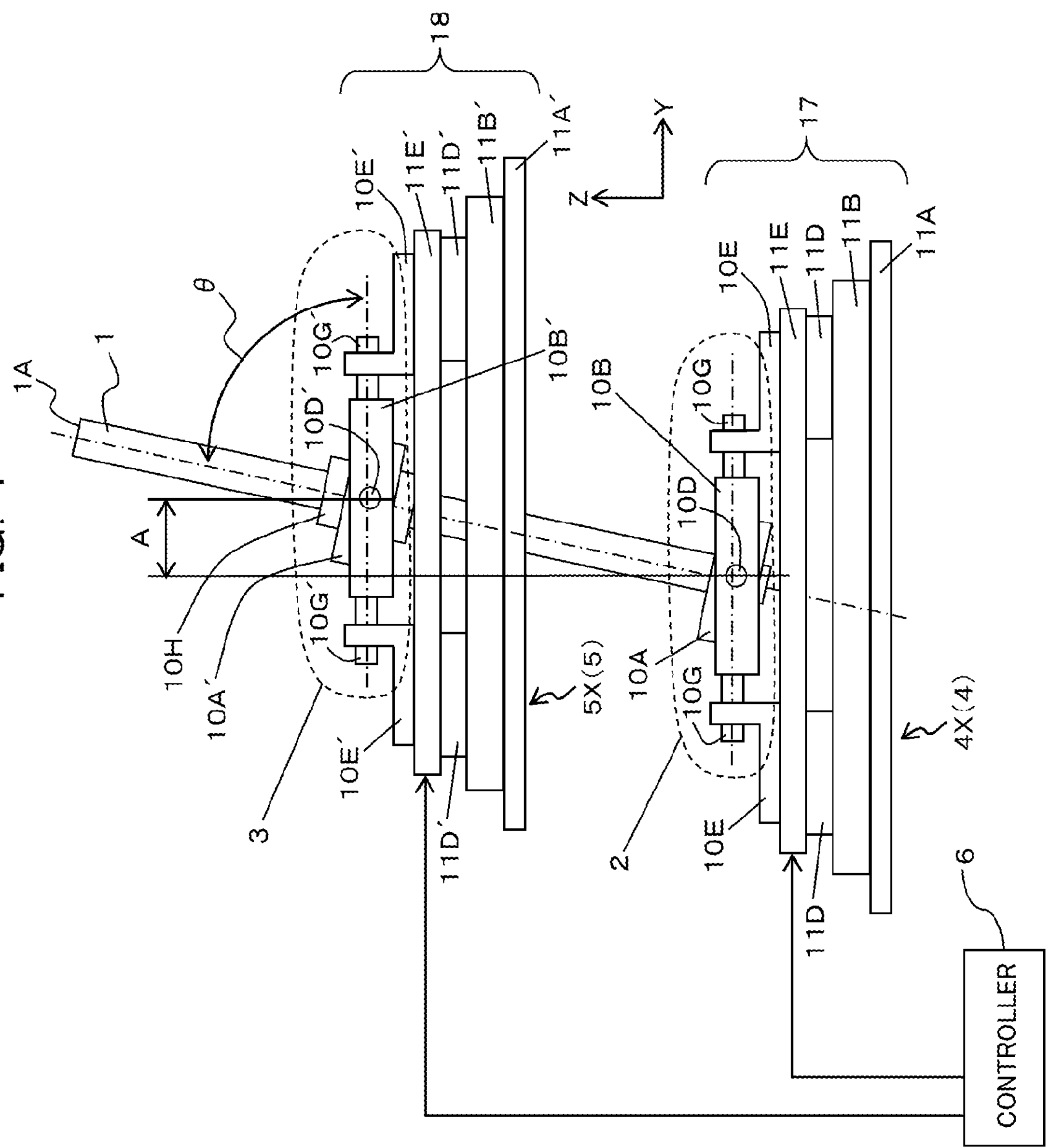
FIGS. 1 and 2 are schematic sectional views illustrating a configuration and a behavior of a robot according to an embodiment.

As depicted in FIG. 1, the robot of the present embodiment includes a tool shaft 1, a first supporting mechanism 2, a second supporting mechanism 3, a first in-plane movement mechanism 4, a second in-plane movement mechanism 5 and a controller 6.

Here, the tool shaft 1 is a shaft having a tip end 1A to which various tools, a table and so forth can be attached. For example, an end effecter such as an air chuck, a table for holding a work or the like is attached to the tip end 1A of the tool shaft 1.

The first supporting mechanism 2 is attached to one portion of the tool shaft 1 and tiltably supports the tool shaft 1. In particular, the first supporting mechanism 2 rotatably supports the tool shaft 1 around two axes (around an X axis and an Y axis; in rotational directions indicated by reference characters X and Y in FIG. 3) orthogonal to an axis (Z axis) along the tool shaft 1 (here, the center axis of the tool shaft 1). It is to be noted here that, since the first supporting mechanism 2 is a supporting mechanism positioned at the lower side, the first supporting mechanism 2 is referred to also as lower side supporting mechanism or lower stage supporting mechanism.

Here, the first supporting mechanism 2 is a universal joint that rotatably supports the tool shaft 1 around the two axes orthogonal to the axis in the direction along the tool shaft 1.

Figure 3:
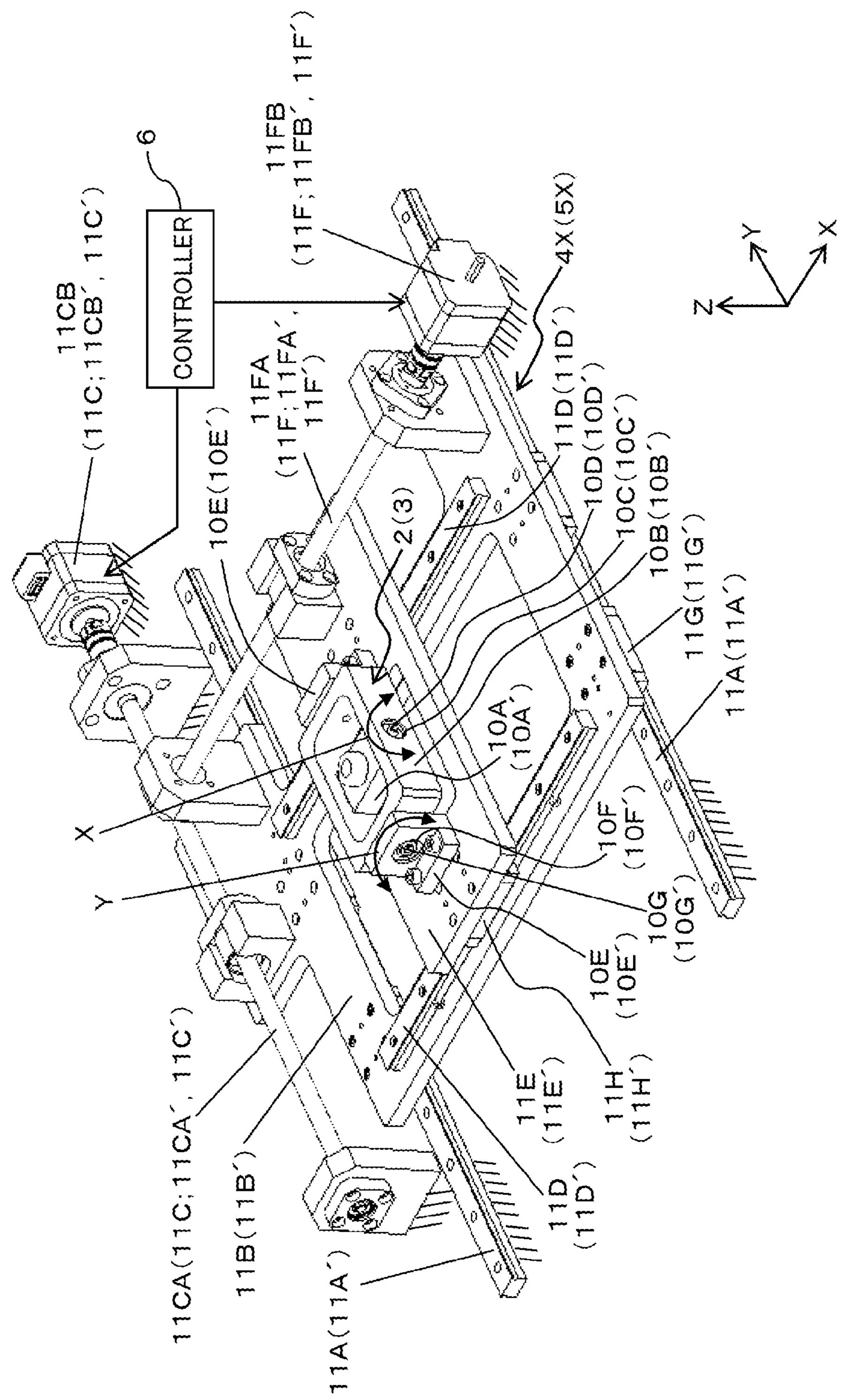
FIG. 3 is a schematic perspective view depicting a configuration of a supporting mechanism and an in-plane movement mechanism that configure the robot according to the present embodiment.

As depicted in FIG. 3, the universal joint 2 includes an inner side holder 10A having a hole into which the tool shaft 1 can be inserted and a ring-shaped outer side holder 10B surrounding the periphery of the inner side holder 10A. The inner side holder 10A is rotatably supported on the inner side of the outer side holder 10B with a bearing 10C interposed therebetween. In particular, the inner side holder 10A includes two rotatable shafts 10D, which are inserted in the bearing 10C mounted on the outer side holder 10B and are rotatably supported on the inner side of the outer side holder 10B through the bearing 10C. Here, the inner side holder 10A is rotatably supported around the X axis on the outer side holder 10B. Therefore, the tool shaft 1 is rotatably supported around the X axis through the inner side holder 10A. Further, the outer side holder 10B is rotatably supported on two fixing members 10E fixed to a second table, which configures the first in-plane movement mechanism 4 hereinafter described, through a bearing 10F. In particular, the outer side holder 10B includes two rotatable shafts 10G, which are inserted in the bearing 10F mounted on the fixing members 10E, and are rotatably supported on the fixing members 10E through the bearing 10F. Here, the outer side holder 10B is rotatably supported around the Y axis on the fixing members 10E. Therefore, the tool shaft 1 is rotatably supported around the Y axis through the inner side holder 10A and the outer side holder 10B.

As depicted in FIG. 1, the second supporting mechanism 3 is attached to a different portion of the tool shaft 1 and supports the tool shaft 1 tiltably and slidably (movably in an axial direction). In particular, the second supporting mechanism 3 rotatably supports the tool shaft 1 around the two axes orthogonal to the axis in the direction along the tool shaft 1, and slidably supports the tool shaft 1 in the axial direction thereof (here, in the axial direction of the center axis of the tool shaft). It is to be noted here that, since the second supporting mechanism 3 is a supporting mechanism positioned at the upper side, the second supporting mechanism 3 is hereinafter referred to also as upper side supporting mechanism or upper stage supporting mechanism.

Here, the second supporting mechanism 3 is a universal joint that including a slider 10H that rotatably supports the tool shaft 1 around the two axes orthogonal to the axis in the direction along the tool shaft 1 and capable of sliding the tool shaft 1 in the axial direction. Here, as the slider 10H, for example, a cylindrical slider capable of supporting the tool shaft 1 rotatably and slidably in the axial direction may be used.

Similarly to the universal joint 2 described above, the universal joint 3 includes an inner side holder 10A' having a hole into which the tool shaft 1 can be inserted and a ring-shaped outer side holder 10B' surrounding the periphery of the inner side holder 10A'. Further, the slider H (here, a cylindrical slider) is mounted in the hole of the inner side holder 10A'. Further, the inner side holder 10A' is rotatably supported on the inner side of the outer side holder 10B' through a bearing 10C'. In particular, the inner side holder 10A' has two rotatable shafts 10D', which are inserted in the bearing 10C' mounted on the outer side holder 10B' and rotatably supported on the inner side of the outer side holder 10B' through the bearing 10C'. Here, the inner side holder 10A' is rotatably supported around the X axis on the outer side holder 10B'. Therefore, the tool shaft 1 is rotatably supported around the X axis through the inner side holder 10A'. Further, the outer side holder 10B' is rotatably supported on a fixing member 10E' fixed to a table 11E', which configures the second in-plane movement mechanism 5 hereinafter described, through a bearing 10F'. In particular, the outer side holder 10B' includes two rotatable shafts 10G', which are inserted in the bearing 10F' mounted on the fixing member 10E' and rotatably supported on the fixing member 10E' through the bearing 10F'. Here, the outer side holder 10B' is rotatably supported around the Y axis on the fixing member 10E'. Therefore, the tool shaft 1 is rotatably supported around the Y axis through the inner side holder 10A' and the outer side holder 10B'.

In this manner, the tool shaft 1 is supported at two points by the first supporting mechanism 2 and the second supporting mechanism 3 provided in a spaced relationship from each other. Therefore, the tool shaft 1 can be supported in stability. Further, the tip end 1A of the tool shaft 1 is restricted so as not to move in the two axial (X axis and Y axis) directions orthogonal to the axis (Z axis) in the direction along the tool shaft 1. In particular, the tip end 1A of the tool shaft 1 is restricted such that, even if a load is applied to the tip end of the tool shaft 1, it does not move in any of the X axis direction and the Y axis direction. Therefore, the tool shaft 1 has very high rigidity in the X axis direction and the Y axis direction. In other words, the rigidity of the tool shaft 1 can be enhanced. In this manner, a robot that is high in rigidity and also is great in transportable weight capacity can be implemented in comparison with the conventional parallel link robot. For example, where a load is applied to the tip end 1A (point of action) of the tool shaft 1, the displacement (deformation amount) of the tip end of the tool shaft is approximately 1/10 to 1/20 time in comparison with that of the conventional parallel link robot. In other words, the rigidity of the tool shaft 1 is enhanced to approximately 10 to 20 times. Therefore, working in stability can be implemented. For example, a work in which operation accuracy of a robot is required, for example, a work for fitting a part into a concave portion, can be performed with certainty without a failure.

The first in-plane movement mechanism 4 moves the first supporting mechanism 2 in a first plane. Therefore, the first supporting mechanism 2 can move in the first plane.

Here, the first in-plane movement mechanism 4 is a first parallel movement mechanism 4X that moves (linearly moves) the first supporting mechanism 2 in parallel in the first plane.

As depicted in FIG. 3, the first parallel movement mechanism 4X includes first rails 11A, a first table 11B, a first table driving unit 11C, second rails 11D, a second table 11E and a second table driving unit 11F. It is to be noted each table is referred to sometimes as movable table. Further, each rail is referred to sometimes as linear rail.

Here, the first rails 11A extend in one direction along the first plane. Here, the one direction along the first plane is the Y axis direction. It is to be noted that first rails 11A fixed to a location such as, for example, a ground surface or a workbench.

The first table 11B is configured so as to move in parallel along the first rails 11A. Here, the first table 11B is movably attached on the first rails 11A through first linear guides 11G.

The first table driving unit 11C drives the first table 11B. Here, the first table driving unit 11C includes a first table ball screw 11CA and a first table motor 11CB that drives the first table ball screw 11CA. In this case, the movement amount of the first table 11B can be varied by the first table ball screw 11CA and the first table motor 11CB. It is to be noted that the first table ball screw 11CA is hereinafter referred to also as first table Y-axis ball screw or first Y-axis ball screw.

The second rails 11D are provided on the first table 11B and extend in another direction orthogonal to the one direction along the first plane. Here, the other direction orthogonal to the one direction along the first plane is the X axis direction.

The second table 11E is configured so as to move in parallel along the second rails 11D. Here, the second table 11E is attached movably on the second rails 11D through the second linear guides 11H.

The second table driving unit 11F drives the second table 11E. Here, the second table driving unit 11F includes a second table ball screw 11FA attached to the second table 11E and a second table motor 11FB that drives the second table ball screw 11FA. In this case, the movement amount of the second table 11E can be varied by the second table ball screw 11FA and the second table motor 11FB. It is to be noted that the second table ball screw 11FA is hereinafter referred to also as second table X-axis ball screw or first X-axis ball screw.

The first supporting mechanism 2 is provided on the second table 11E. Here, the universal joint as the first supporting mechanism 2 is fixed to the surface of the second table 11E.

It is to be noted that a block wherein the first supporting mechanism 2 is provided on the first parallel movement mechanism 4X in this manner is referred to as first stage 17.

As depicted in FIG. 1, the second in-plane movement mechanism 5 moves the second supporting mechanism 3 in the second plane. In particular, the second in-plane movement mechanism 5 is positioned over the first plane and moves the second supporting mechanism 3 in the second plane in parallel to the first plane. Therefore, the second supporting mechanism 3 is movable in the second plane.

Here, the second in-plane movement mechanism 5 is a second parallel movement mechanism 5X that moves (linearly moves) the second supporting mechanism 3 in parallel in the second plane.

Similarly to the first parallel movement mechanism 4X described hereinabove, the second parallel movement mechanism 5X includes third rails 11A', a third table 11B', a third table driving unit 11C', fourth rails 11D', a fourth table 11E' and a fourth table driving unit 11F'.

Here, the third rails 11A' extend in one direction along the second plane. Here, the one direction along the second plane is the Y axis direction. It is to be noted that the third rails 11A' are fixed to a location such as, for example, a ground surface or a workbench.

The table 11B' is configured so as to move in parallel along the third rails 11A'. Here, the third table 11B' is attached movably to the third rails 11A' through third linear guides 11G'.

The third table driving unit 11C' drives the third table 11B'. Here, the third table driving unit 11C' includes a third table ball screw 11CA' attached to the third table 11B' and a third table motor 11CB' that drives the third table ball screw 11CA'. In this case, the movement amount of the third table 11B' can be varied by the third table ball screw 11CA' and the third table motor 11CB'. It is to be noted that the third table ball screw 11CA' is hereinafter referred to also as third table Y-axis ball screw or second Y-axis ball screw.

The fourth rails 11D' are provided on the third table 11B' and extend in another direction orthogonal to the one direction along the second plane. Here, the other direction orthogonal to the one direction along the second plane is the X axis direction.

the fourth table 11E' is configured to move in parallel along the fourth rails 11D'. Here, the fourth table 11E' is movably attached on the fourth rails 11D' through fourth linear guides 11H'.

The fourth table driving unit 11F' drives the fourth table 11E'. Here, the fourth table driving unit 11F' includes a fourth table ball screw 11FA' attached to the fourth table 11E' and a fourth table motor 11FB' that drives the fourth table ball screw 11FA'. In this case, the movement amount of the fourth table 11E' can be varied by the fourth table ball screw 11FA' and the fourth table motor 11FB'. It is to be noted that the fourth table ball screw 11FA' is hereinafter referred to also as fourth table X-axis ball screw or second X-axis ball screw.

The second supporting mechanism 3 is provided on the fourth table 11E'. Here, the universal joint as the second supporting mechanism 3 is fixed to the surface of the fourth table 11E'.

It is to be noted that a block wherein the second supporting mechanism 3 is provided on the second parallel movement mechanism 5X in this manner is referred to sometimes as second stage 18.

In this manner, in the present embodiment, the first plane along which the first supporting mechanism 2 is moved and the second plane along which the second supporting mechanism 3 is moved are positioned above and below and are provided in parallel to each other. In other words, the first supporting mechanism 2 and the second supporting mechanism 3 are positioned above and below each other and move in parallel to each other. Further, since the tool shaft 1 is supported by the first supporting mechanism 2 and the second supporting mechanism 3, also the tool shaft 1 moves in parallel. In short, the tool shaft 1 can move in the two-axis direction (X-axis direction and Y-axis direction) orthogonal to each other. Here, the first in-plane movement mechanism 4 that moves the first supporting mechanism 2 and the second in-plane movement mechanism 5 that moves the second supporting mechanism 3 are provided above and below each other and are provided in parallel to each other. In other words, the first rails 11A and the third rails 11A' are positioned above and below each other and are provided in parallel to each other. Further, the first table 11B and the third table 11B' are positioned above and below each other and are provided in parallel to each other. Further, the second rails 11D and the fourth rails 11D' are positioned above and below each other and are provided in parallel to each other. Further, the second table 11E and the fourth table 11E' are positioned above and below each other and are provided in parallel to each other. Therefore, the first stage 17 and the second stage 18 are positioned above and below each other and are provided in parallel to each other The robot structured such that the two stages 17 and 18 are provided in parallel to each other in this manner is referred to also as parallel stage type robot. By providing the stages 17 and 18 in two stages above and below each other and supporting the tool shaft 1 at two points by the supporting mechanisms 2 and 3 (here, universal joints) provided on the stages 17 and 18 in this manner, not only in-plane movement of the tool shaft 1 but also posture variation of the tool shaft 1 by tilting can be implemented.

It is to be noted that, while, in the present embodiment, the first stage 17 and the second stage 18 are provided in parallel to each other, the provision of them is not limited to this. For example, where the first and second stages cannot be provided in parallel to each other depending upon a condition of a working area or in a like case, the first stage 17 and the second stage 18 may be not be provided in parallel to each other. In this case, since the second supporting mechanism 3 is provided so as to support the tool shaft 1 slidably as described above, even if the distance between the first supporting mechanism 2 and the second supporting mechanism 3, namely, the distance in the direction along the tool shaft 1, varies, the variation of the distance can be absorbed. However, it is preferable to provide the first stage 17 and the second stage 18 in parallel to each other as in the present embodiment. This is because, if the first stage 17 and the second stage 18 are provided in parallel to each other, then since the relationship between the relative distance between the first supporting mechanism 2 and the second supporting mechanism 3 and the posture variation of the tool shaft 1 is same in the overall range of movement, the control can be prevented from being complicated.

The controller 6 controls the first in-plane movement mechanism 4 and the second in-plane movement mechanism 5. In particular, the controller 6 controls the in-plane position (here, the in-plane position of the tip end of the tool shaft) and the tilting angle of the tool shaft 1 by controlling the first in-plane movement mechanism 4 and the second in-plane movement mechanism 5. In the present embodiment, the controller 6 controls the first table motor 11CB, third table motor 11CB', second table motor 11FB and fourth table motor 11FB'. The controller 6 is, for example, a computer including a CPU, a memory, a storage apparatus and so forth. It is to be noted that an encoder capable of detecting rotation angles of the rotary shafts of the first table motor 11CB, third table motor 11CB', second table motor 11FB and fourth table motor 11FB' may be provided such that the controller 6 controls the first table motor 11CB, third table motor 11CB', second table motor 11FB and fourth table motor 11FB' based on information from the encoder.

In the present embodiment, the tool shaft 1 is supported at two points by the first supporting mechanism 2 and the second supporting mechanism 3 as described above. Further, the first supporting mechanism 2 is movable in the first plane by the first in-plane movement mechanism 4. Further, the second supporting mechanism 3 is movable in the second plane by the second in-plane movement mechanism 5. Further, the controller 6 moves the first supporting mechanism 2 in the first plane by controlling the first in-plane movement mechanism 4. Further, the controller 6 moves the second supporting mechanism 3 in the second plane by controlling the second in-plane movement mechanism 5.

Figure 2:
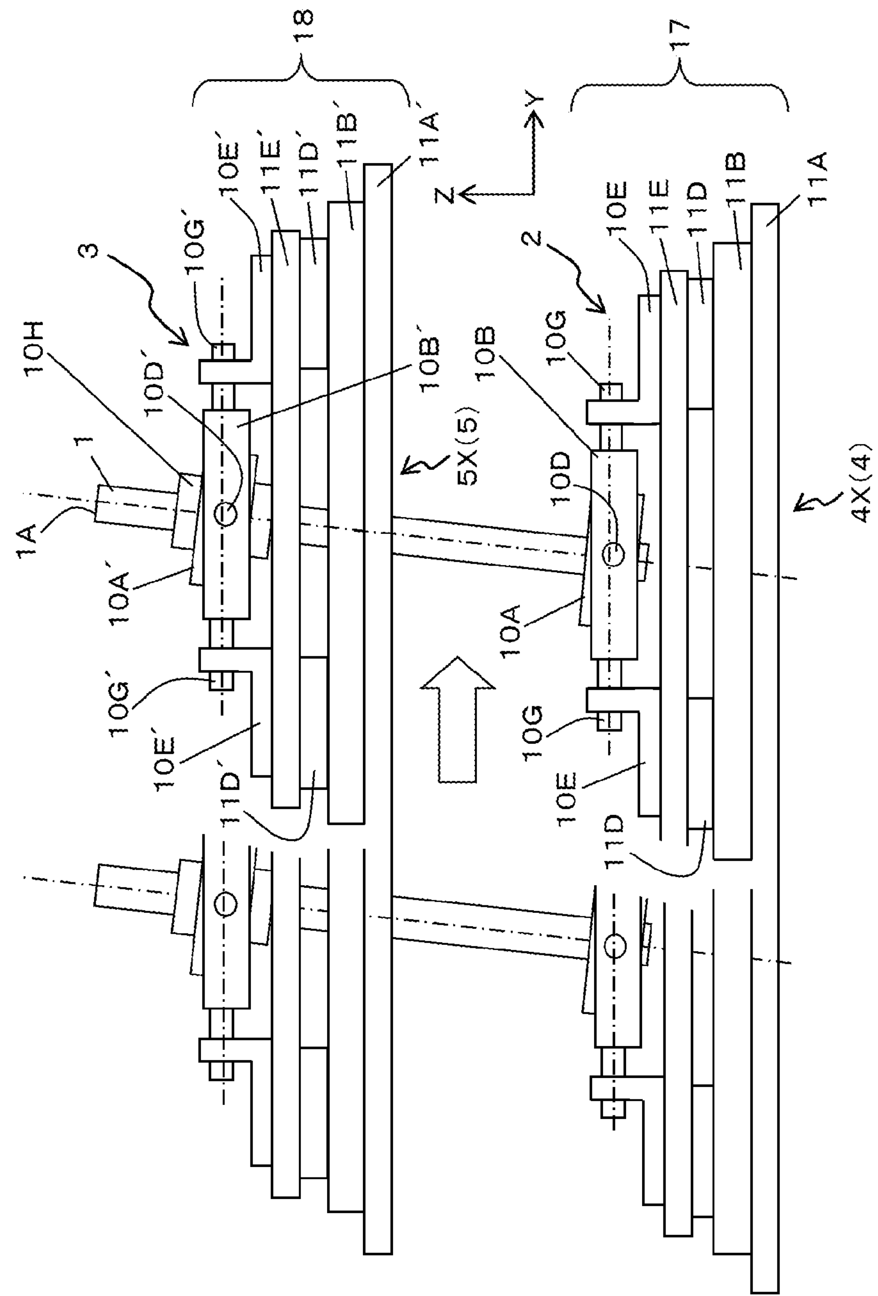

In this case, as depicted in FIG. 2, the tool shaft 1 can be moved in parallel by controlling the first in-plane movement mechanism 4 and the second in-plane movement mechanism 5 to move the first supporting mechanism 2 and second supporting mechanism 3, which support the tool shaft 1, in the same direction in synchronism with each other. Consequently, the in-plane position of the tool shaft 1 can be controlled. In particular, the in-plane position of the tool shaft 1 is controlled such that the movement amount of the first supporting mechanism 2 in the first plane, namely, the movement amount in the X axis direction and the movement amount in the Y axis direction, and the movement amount of the second supporting mechanism 3 in the second plane, namely, the movement amount in the X axis direction and the movement amount in the Y axis direction, become equal to each other and besides the moving directions of the first supporting mechanism 2 and the second supporting mechanism 3 become same as each other. Consequently, the tool shaft 1 can be moved in parallel without changing the tilting angle of the tool shaft 1 and the in-plane position of the tool shaft 1 can be controlled. It is to be noted that to control the in-plane position of the tool shaft 1 signifies to control the position of the tool shaft 1 in the two-axis direction (X axis direction and Y axis direction) orthogonal to each other.

Further, by controlling the first in-plane movement mechanism 4 and the second in-plane movement mechanism 5 to move the first supporting mechanism 2 and second supporting mechanism 3, which support the tool shaft 1, separately in the same direction, the tool shaft 1 is moved in parallel, and simultaneously the positions of the first supporting mechanism 2 and the second supporting mechanism 3 can be displaced to tilt the tool shaft 1. Consequently, the in-plane position and the tilting angle of the tool shaft 1 can be controlled. In particular, the in-plane position and the tilting angle of the tool shaft 1 are controlled such that the movement amount of the first supporting mechanism 2 in the first plane and the movement amount of the second supporting mechanism 3 in the second plane are different from each other and besides the moving directions of the first supporting mechanism 2 and the second supporting mechanism 3 become same as each other. Consequently, while the tool shaft 1 is moved in parallel, simultaneously the positions of the first supporting mechanism 2 and the second supporting mechanism 3 can be displaced to tilt the tool shaft 1. Consequently, the in-plane position and the tilting angle of the tool shaft 1 can be controlled.

Further, by controlling the first in-plane movement mechanism 4 and the second in-plane movement mechanism 5 to move at least one of the first supporting mechanism 2 and the second supporting mechanism 3, which support the tool shaft 1, for example, as depicted in FIG. 1, the positions of the first supporting mechanism 2 and the second supporting mechanism 3 can be displaced to tilt the tool shaft 1. For example, if the second supporting mechanism 3 positioned over the first supporting mechanism 2 is moved in the rightward direction with respect to the first supporting mechanism 2, then the tool shaft 1 is tilted in the rightward direction. If the second supporting mechanism 3 positioned over the first supporting mechanism 2 is moved reversely in the leftward direction with respect to the first supporting mechanism 2, then the tool shaft 1 is tilted in the leftward direction. Similarly, if the second supporting mechanism 3 positioned over the first supporting mechanism 2 is moved in the forward direction with respect to the first supporting mechanism 2, then the tool shaft 1 is tilted in the forward direction. If the second supporting mechanism 3 positioned over the first supporting mechanism 2 is moved reversely in the rearward direction with respect to the first supporting mechanism 2, then the tool shaft 1 is tilted in the rearward direction. It is to be noted that, since the distance between the first supporting mechanism 2 and the second supporting mechanism 3 increases as the tilting angle of the tool shaft 1 increases, the second supporting mechanism 3 is provided so as to support the tool shaft 1 slidably as described above. Further, only the first supporting mechanism 2 may be moved or only the second supporting mechanism 3 may be moved. Further, the first supporting mechanism 2 and the second supporting mechanism 3 may be moved in directions different from each other (including the opposite directions).

In this case, the tilting angle (indicated by reference character θ in FIG. 1) of the tool shaft 1 varies in response to the relative distance (in-plane direction distance; indicated by reference character A in FIG. 1) between the first supporting mechanism 2 and the second supporting mechanism 3 in the direction parallel to the first and second planes. Therefore, the tilting angle of the tool shaft 1 can be controlled by controlling the relative distance between the first supporting mechanism 2 and the second supporting mechanism 3 in the direction parallel to the first and second planes. It is to be noted that to control the tilting angle of the tool shaft 1 signifies to control the rotation angle of the tool shaft 1 around the two axes (around the X axis and around the Y axis) orthogonal to the axis (Z axis) in the direction along the tool shaft 1.

Further, in this case, by settings of the movement amount and the moving direction of the first supporting mechanism 2 and the second supporting mechanism 3, not only it is possible to control only the tilting angle of the tool shaft 1 but also it is possible to control the in-plane position of the tool shaft 1 in addition to the control of the tilting angle of the tool shaft 1.

In this manner, the in-plane position control of the tool shaft 1 can be performed by controlling the first supporting mechanism. 2 and the second supporting mechanism 3 so as not to vary the relative positional relationship between them. Further, the tilting angle control (posture control; posture changing control) of the tool shaft 1 can be performed by controlling the first supporting mechanism 2 and the second supporting mechanism 3 so as to vary the relative positional relationship between them. Therefore, in comparison with the conventional parallel link robot, the range of movement in the horizontal direction is great and also the range of posture change is great.

Figure 4:
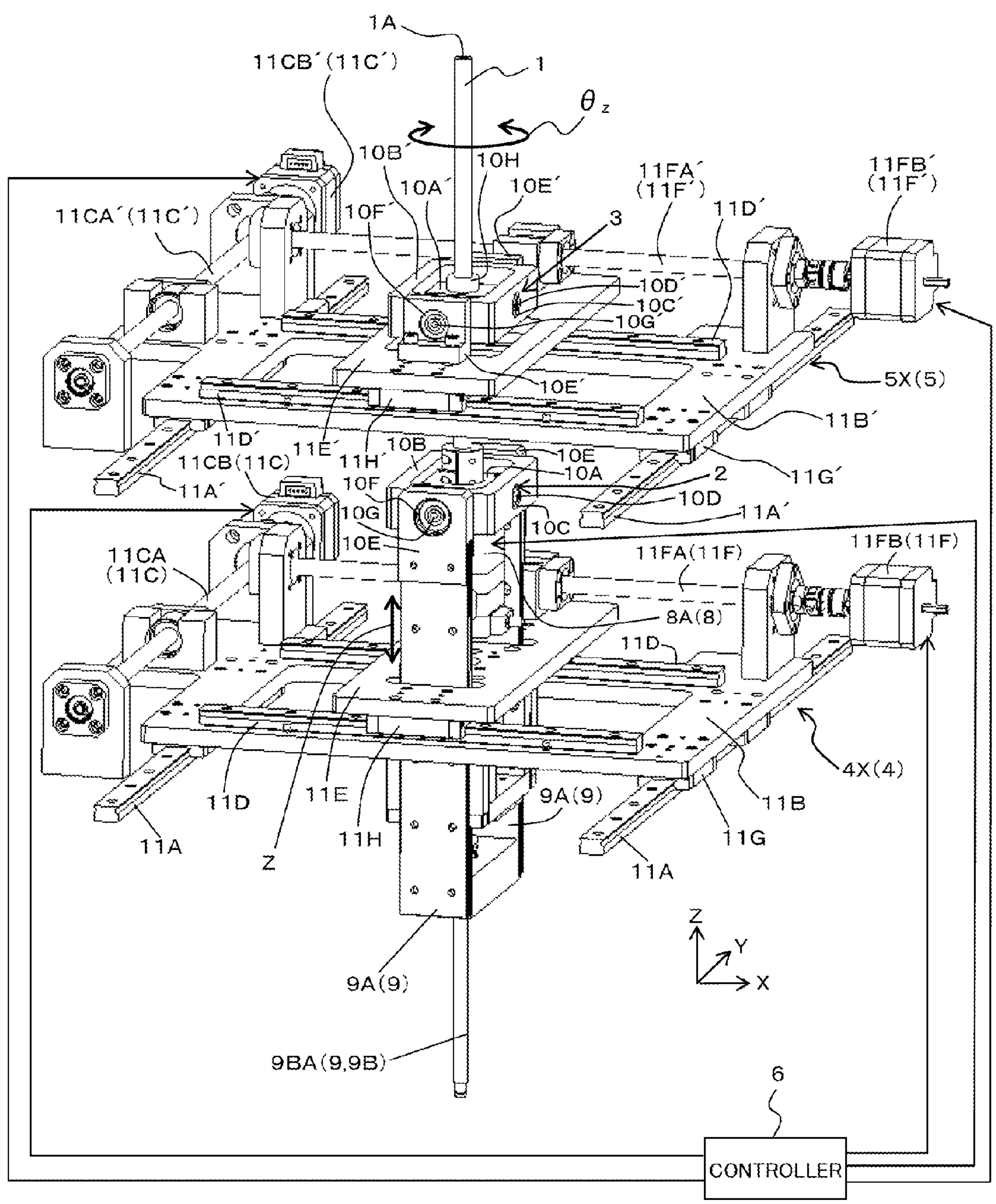
FIGS. 4 and 5 are schematic perspective views depicting a particular example of the configuration of the robot according to the present embodiment.

Incidentally, in a particular example of the configuration of the present embodiment, a tool shaft rotation driving unit 8 that rotates the tool shaft 1 is further provided as depicted in FIG. 4. In particular, the tool shaft rotation driving unit 8 that rotates the tool shaft 1 around the center axis (in a direction indicated by reference character $\theta_Z$ in FIG. 4) thereof is provided. Here, the tool shaft rotation driving unit 8 includes a tool shaft motor 8A attached to an end portion of the tool shaft 1. In particular, the tool shaft 1 is directly driven by the tool shaft motor 8A. The tool shaft motor 8A is attached to the first supporting mechanism 2. Here, the tool shaft motor 8A is attached to the inner side holder 10A that configures the universal joint as the first supporting mechanism 2. Therefore, an end portion of the tool shaft 1 is attached to the first supporting mechanism 2 through the tool shaft motor 8A. Since the end portion of the tool shaft 1 is rotated by the tool shaft motor 8A, the tool shaft 1 is rotatably supported by the first supporting mechanism 2. In this case, the second supporting mechanism 3 rotatably supports the tool shaft 1. For example, the second supporting mechanism 3 may be configured so as to include the slider 10H supporting the tool shaft 1 rotatably and slidably in the axial direction as described above. For example, if a lifespan and so forth are taken into consideration, then it is preferable to use, for the slider 10H, a stroke bush or a slide rotary bush of the Nippon Bearing Co., Ltd., which are ready for both of rotary motion and linear motion. In this manner, the first supporting mechanism 2 and the second supporting mechanism 3 are provided so as to rotatably support the tool shaft 1. Further, the controller 6 controls also the tool shaft rotation driving unit 8, namely, the tool shaft motor 8A. In particular, the controller 6 control also rotation of the tool shaft 1 by controlling the tool shaft rotation driving unit 8. It is to be noted that an encoder capable of detecting the rotation angle of the rotary shaft of the tool shaft motor 8A may be provided such that the controller 6 controls the tool shaft motor 8A based on information from the encoder.

Figure 5:
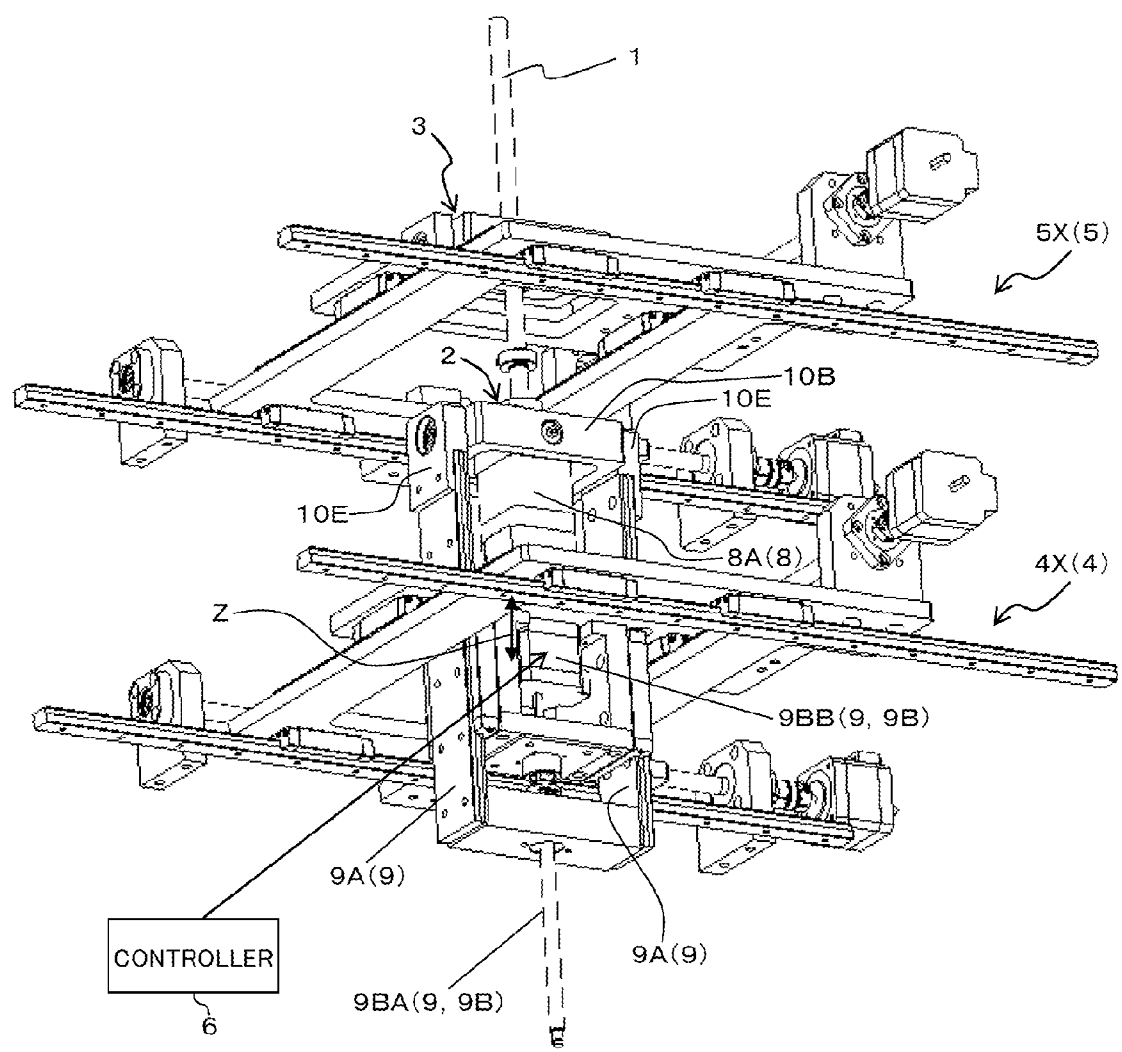
Figure 6:
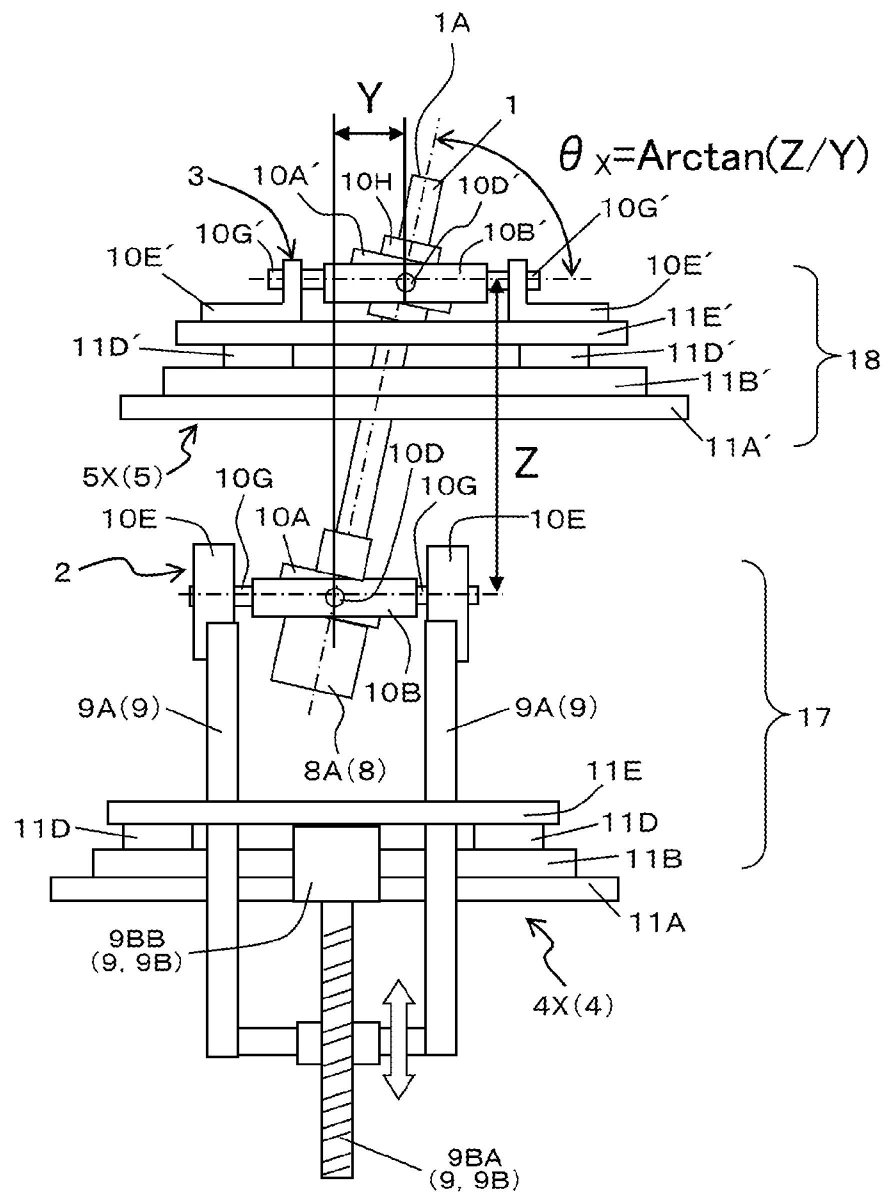
FIGS. 6 and 7 are schematic sectional views illustrating a configuration and a behavior of the robot according to the present embodiment in the particular example of the configuration.
Figure 7:
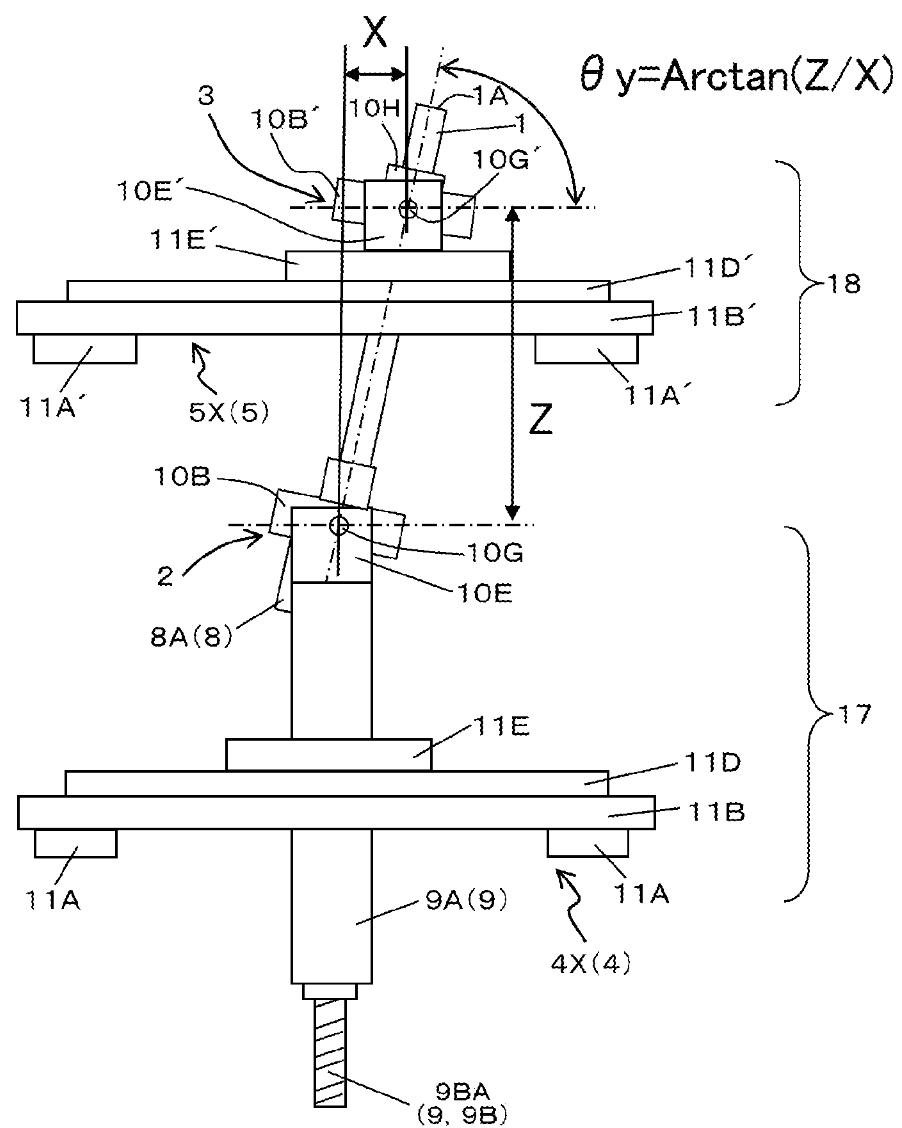

Further, in the particular example of the configuration in the present embodiment, an axial direction movement mechanism 9 that moves the tool shaft 1 in an axial direction (in a direction indicated by reference character Z in FIG. 4) is further provided. Here, the axial direction is the Z axis direction. In particular, the axial direction is a direction crossing with the first and second planes, for example, a direction orthogonal to the first and second planes. Consequently, the tool shaft 1 can move in three axial directions orthogonal to each other. Further, as depicted in FIGS. 4 and 5, the axial direction movement mechanism 9 includes guides 9A that guide the first supporting mechanism 2 and the second supporting mechanism 3 to move in directions in which the first supporting mechanism 2 and the second supporting mechanism 3 move toward and away from each other, and a guide driving unit 9B that drives the guides 9A. Here, the guides 9A guide the first supporting mechanism 2 to move in directions in which the first supporting mechanism 2 moves toward and away from the second supporting mechanism 3. Further, the guides 9A are attached to a fixing member 10E that configures the first supporting mechanism 2. In particular, the fixing member 10E is not fixed on the second table 11E that configures the first in-plane movement mechanism 4 but is attached to the guides 9A. It is to be noted that the guides 9A are referred to also as linear guides. Here, the guide driving unit 9B includes a guide ball screw 9BA attached to the guides 9A and a guide motor 9BB that drives the guide ball screw 9BA. It is to be noted that the guide ball screw 9BA is referred to also as guide Z axis ball screw or Z axis ball screw. In this case, the movement amount of the guides 9A, namely, the movement amount of the tool shaft 1 in the axial direction, can be varied by the guide ball screw 9BA and the guide motor 9BB. The controller 6 controls the axial direction movement mechanism 9, particularly, the guide motor 9BB. In particular, the controller 6 controls the axial direction position of the tool shaft 1 by controlling the axial direction movement mechanism 9. Therefore, in comparison with the conventional parallel link robot, the range of movement in the vertical direction is great. In this manner, if the configuration that moves the first supporting mechanism 2 in directions toward and away from the second supporting mechanism 3 in order to move the tool shaft 1 in the axial direction, namely, the configuration with which the first supporting mechanism 2 moves upwardly and downwardly, is adopted, then the tilting angle of the tool shaft 1 depends upon the distance between the first supporting mechanism 2 and the second supporting mechanism 3 in the Z axis direction. In particular, the tilting angle θ of the tool shaft 1 is defined by the distance Z between the first supporting mechanism 2 and the second supporting mechanism 3 in the Z axis direction and the distance (relative distance) A between the first supporting mechanism 2 and the second supporting mechanism 3 in an in-plane direction [$\theta=\mathrm{Arctan}(Z/A)$]. For example, as depicted in FIG. 6, the tilting angle θx of the tool shaft 1 in the YZ plane is defined by the distance Z between the first supporting mechanism 2 and the second supporting mechanism 3 in the Z axis direction and the distance Y between the first supporting mechanism 2 and the second supporting mechanism 3 in the Y axis direction, namely, the difference $\Delta Y=Y2-Y1$ between the movement amount Y1 of the first supporting mechanism 2 in the Y axis direction and the movement amount Y2 of the second supporting mechanism 3 in the Y axis direction [$\theta x=\mathrm{Arctan}(Z/Y)$; $\theta x=\mathrm{Arctan}(Z/(Y2-Y1))$]. Further, for example, as depicted in FIG. 7, the tilting angle θy of the tool shaft the an XZ plane is defined by the distance Z between the first supporting mechanism 2 and the second supporting mechanism 3 in the Z axis direction and the distance X between the first supporting mechanism 2 and the second supporting mechanism 3 in the X axis direction, namely, the difference $\Delta X=X2-X1$ between the movement amount X1 of the first supporting mechanism 2 in the X axis direction and the movement amount X2 of the second supporting mechanism 3 in the X axis direction [$\theta y=\mathrm{Arctan}(Z/X)$; $\theta y=\mathrm{Arctan}(Z/(X2-X1))$].

Therefore, in the posture control of the tool shaft 1, it is necessary to take the distance Z between the first supporting mechanism 2 and the second supporting mechanism 3 in the Z axis direction into consideration. It is to be noted that an encoder capable of detecting a rotational angle of the rotation shaft of the guide driving unit 9B may be provided such that the controller 6 controls the guide motor 9BB based on information from the encoder.

In this manner, in the robot of the present embodiment, the tool shaft 1 has totaling six degrees of freedom including two degrees of freedom with which the tool shaft 1 can move in the two axial directions (X axis direction and Y axis direction) orthogonal to each other, two degrees of freedom with which the tool shaft 1 can rotate (tilt) around the two axes (around the X axis and the Y axis) orthogonal to the axis (Z axis) in the direction along the tool shaft 1, one degree of freedom with which the tool shaft 1 can rotate around the center axis thereof and one degree of freedom with which the tool shaft 1 can move in the axial direction. In short, the robot having a high rigidity, a great range of movement and a high degree of freedom can be implemented. On the other hand, if it is tried to increase the degree of freedom in the conventional parallel link robot, then the rigidity degrades.

It is to be noted that, while, in the particular example of the configuration (refer to FIG. 4) of the present embodiment, the tool shaft rotation driving unit 8 that rotates the tool shaft 1 and the axial direction movement mechanism 9 that moves the tool shaft 1 in the axial direction are provided, one or both of the components just mentioned may not be provided. Further, while, in the present embodiment, the first supporting mechanism 2 supports the tool shaft 1 tiltably and the second supporting mechanism 3 supports the tool shaft 1 tiltably and slidably, the supporting manner of the tool shaft 1 is not limited to this, and the first supporting mechanism 2 may be provided so as to support the tool shaft 1 tiltably and slidably while the second supporting mechanism 3 is provided so as to support the tool shaft 1 tiltably. In particular, one of the first supporting mechanism 2 and the second supporting mechanism 3 may be provided so as to support the tool shaft 1 slidably (movable in the axial direction). In particular, one of the first supporting mechanism 2 and the second supporting mechanism 3 may be provided as a universal joint including a slider capable of sliding the tool shaft 1 in the axial direction. Further, while, in the particular example of the configuration (refer to FIG. 4) of the present embodiment, the tool shaft rotation driving unit 8 that rotates the tool shaft 1 is attached to the first supporting mechanism 2 and the axial direction movement mechanism 9 that moves the tool shaft 1 in the axial direction is attached to the first supporting mechanism 2, the attachment is not limited to this. For example, both of the tool shaft rotation driving unit 8 and the axial direction movement mechanism 9 may be attached to the second supporting mechanism 3. In this case, the tool shaft rotation driving unit 8 and the axial direction movement mechanism 9 may be attached to the second supporting mechanism 3 in the opposite directions to each other. Further, in this case, it is preferable to provide the first supporting mechanism 2 so as to support the tool shaft 1 tiltably and slidably and provide the second supporting mechanism 3 so as to support the tool shaft 1 tiltably. In this case, the tip end 1A of the tool shaft 1 is positioned at the lower side. Further, for example, the tool shaft rotation driving unit 8 and the axial direction movement mechanism 9 may be attached to the first supporting mechanism 2 and the second supporting mechanism 3, respectively. Or, the tool shaft rotation driving unit 8 and the axial direction movement mechanism 9 may be attached to the second supporting mechanism 3 and the first supporting mechanism 2, respectively. Further, the robot in the present embodiment may be used reversely in the upward and downward direction or may be used so as to be directed in a horizontal direction.

Accordingly, with the robot of the present embodiment, there is an advantage that the robot having a great range of movement and a high rigidity can be implemented.

It is to be noted that the present invention is not limited to the configuration of the embodiment specifically described hereinabove, and modifications can be made without departing from the scope of the present invention.

Figure 8:
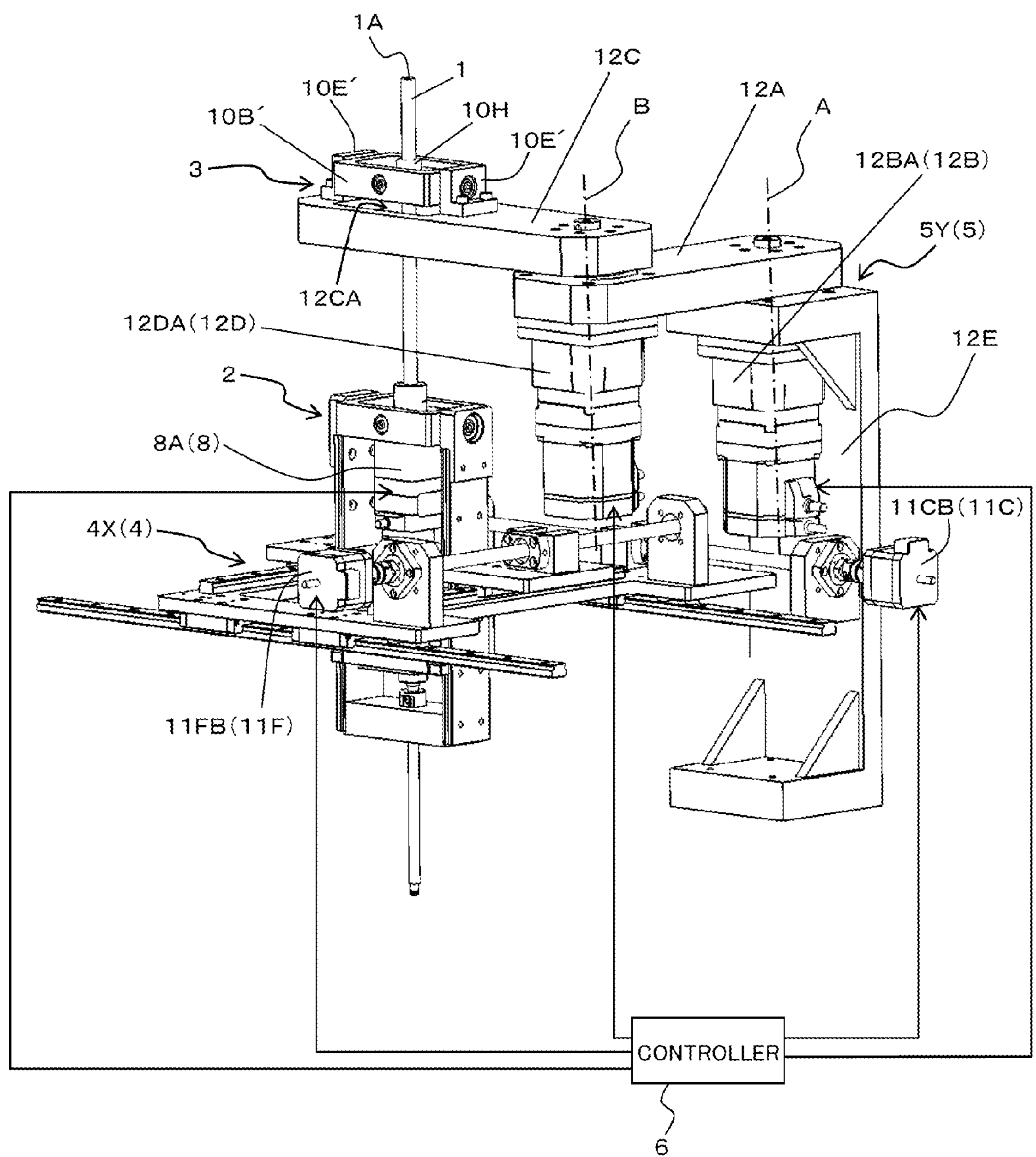
FIG. 8 is a schematic perspective view depicting a configuration of a robot according to a first modification to the present embodiment.

For example, while, in the embodiment described above, the second in-plane movement mechanism 5 is provided as the second parallel movement mechanism 5X that moves the second supporting mechanism 3 in parallel in the second plane, the second in-plane movement mechanism 5 is not limited to this. For example, as depicted in FIG. 8, the second in-plane movement mechanism 5 may be provided as a second rotation movement mechanism 5Y that rotationally moves the second supporting mechanism 3 in the second plane. It is to be noted that configurations of the other part are same as those of the embodiment described above. This is referred to as first modification.

In this case, the second rotation movement mechanism 5Y may include a third arm 12A, a third arm driving unit 12B, a fourth arm 12C and a fourth arm driving unit 12D. Here, the third arm 12A rotates in a direction along the second plane around one end portion thereof as a rotation center. Meanwhile, the third arm driving unit 12B drives the third arm 12A. For example, the third arm driving unit 12B may include a third arm motor 12BA attached to one end portion of the third arm 12A. Further, the fourth arm 12C is configured such that it has the other end portion of the third arm 12A attached to one end portion thereof and rotates in a direction along the second plane around the one end portion thereof as a rotation center. Further, the fourth arm driving unit 12D drives the fourth arm 12C. For example, the fourth arm driving unit 12D may include a fourth arm motor 12DA attached to one end portion of the fourth arm 12C. It is to be noted that a robot having such a structure as just described is referred to also as scalar robot or horizontal articulated robot. Further, the second supporting mechanism 3 may be provided at the other end portion of the fourth arm 12C.

Here, the third arm motor 12BA is attached to a fixing stand 12E and one end portion of the third arm 12A is attached to the rotary shaft of the third arm motor 12BA, and the third arm 12A is driven to rotate by the third arm motor 12BA. It is to be noted that, while the rotation center (rotation axis; indicated by reference character A in FIG. 8) of the third arm 12A is the center of the rotary shaft of the third arm motor 12BA, since the third arm motor 12BA is attached to one end portion of the third arm 12A, the third arm 12A rotates (revolves) around the one end portion as the rotation center. Further, the fourth arm motor 12DA is attached to the other end portion of the third arm 12A and one end portion of the fourth arm 12C is attached to the rotary shaft of the fourth arm motor 12DA such that the fourth arm 12C is driven to rotate by the fourth arm motor 12DA. It is to be noted that, while the rotation center (rotation axis; indicated by reference character B in FIG. 8) of the fourth arm 12C is the center of the rotary shaft of the fourth arm motor 12DA, since the fourth arm motor 12DA is attached to one end portion of the fourth arm 12C, the fourth arm 12C rotates (revolves) around the one end portion as the rotation center. Further, an opening 12CA having a size with which the tool shaft 1 can tilt is provided at the other end portion of the fourth arm 12C, and the second supporting mechanism 3 is provided over the opening 12CA. Further, the tool shaft 1 is attached to the second supporting mechanism 3 through the opening 12CA. In this case, by rotation of the two arms including the third arm 12A and the fourth arm 12C, the second supporting mechanism 3 can be rotationally moved in the second plane.

In this case, the controller 6 controls the first table motor 11CB, second table motor 11FB, third arm motor 12BA and fourth arm motor 12DA. In particular, the controller 6 controls the in-plane position and the tilting angle of the tool shaft 1 by controlling the first parallel movement mechanism (first in-plane movement mechanism) 4X and the second rotation movement mechanism (second in-plane movement mechanism) 5Y. It is to be noted that an encoder capable of detecting the rotational angle each of the rotary shafts including the first table motor 11CB, second table motor 11FB, third arm motor 12BA and fourth arm motor 12DA may be provided such that the controller 6 controls the first table motor 11CB, second table motor 11FB, third arm motor 12BA and fourth arm motor 12DA based on information from the encoders.

It is to be noted that the configuration of the second rotation movement mechanism 5Y is not limited to this, and a scalar robot that includes a ball screw spline including a ball screw spline shaft, a ball screw nut and a ball spline nut may be used as the second rotation movement mechanism similarly to a first rotation movement mechanism 4Y hereinafter described (for example, refer to FIG. 9). In this case, it is preferable to use a constant-velocity joint whose rotation speed does not vary by infrection as a universal joint to be used as the second supporting mechanism 3. Further, the slider 10H may be provided on the first supporting mechanism 2.

Similarly, while, in the embodiment described above, the first in-plane movement mechanism 4 is provided as the first parallel movement mechanism 4X that moves the first supporting mechanism 2 in parallel in the second plane, the first in-plane movement mechanism 4 is not limited to this. For example, the first in-plane movement mechanism 4 may be provided as a first rotation movement mechanism that rotationally moves the first supporting mechanism 2 in the first plane.

In this case, the first rotation movement mechanism may include a first arm, a first arm driving unit, a second arm and a second arm driving unit. Here, the first arm rotates in a direction along the first plane around one end portion thereof as the rotation center. Further, the first arm driving unit drives the first arm. For example, the first arm driving unit may include a first arm motor attached to one end portion of the first arm. Further, the other end portion of the first arm is attached to one end portion of the second arm such that the second arm rotates in the direction along the first plane around the one end portion thereof as the rotation center. Further, the second arm driving unit drives the second arm. For example, the second arm driving unit may include a second arm motor attached to one end portion of the second arm. It is to be noted that a robot having such a structure as just described is referred to as scalar robot or horizontal articulated robot. Further, the first supporting mechanism 2 may be provided at the other end portion of the second arm.

Here, the first arm motor is attached to a fixing stand and one end portion of the first arm is attached to the rotary shaft of the first arm motor, and the first arm is driven to rotate by the first arm motor. It is to be noted that, while the rotation center of the first arm is the center of the rotary shaft of the first arm motor, since the first arm motor is attached to one end portion of the first arm, the first arm rotates (revolves) around one end portion thereof as the rotation center. Further, the second arm motor is attached to the other end portion of the first arm and one end portion of the second arm is attached to the rotary shaft of the second arm motor, and the second arm is driven to rotate by the second arm motor. It is to be noted that, while the rotation center of the second arm is the center of the rotary shaft of the second arm motor, since the second arm motor is attached to one end portion of the second arm, the second arm rotates (revolves) around one end portion thereof as the rotation center. Further, an opening having a size with which the tool shaft 1 can tilt is provided at the other end portion of the second arm, and the first supporting mechanism 2 is provided over the opening. Further, the tool shaft 1 is attached to the first supporting mechanism 2 through the opening. In this case, the first supporting mechanism 2 can be rotationally moved in the first plane by rotation of the two arms including the first and second arms.

Figure 9:
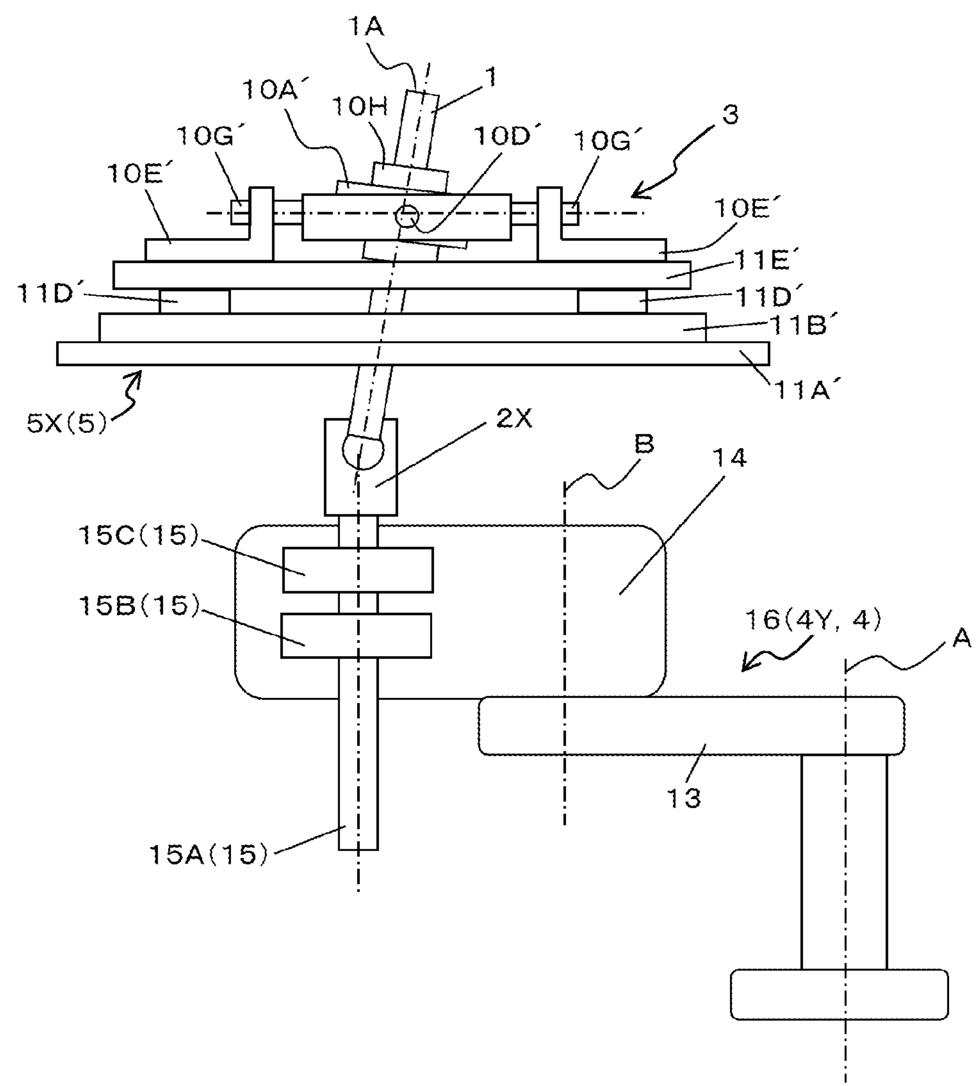
FIG. 9 is a schematic sectional view depicting a different example of a configuration of the robot according to the first modification to the present embodiment.

It is to be noted that the configuration of the first rotation movement mechanism is not limited to this, and a scalar robot 16 that includes a first arm 13, a second arm and a ball screw spline 15 including a ball screw spline shaft 15A, a ball screw nut 15B and a ball spline nut 15C may be used as the first rotation movement mechanism 4Y, for example, as depicted in FIG. 9. In this case, it is preferable to use a constant-velocity joint 2X whose rotation speed does not vary by inflection as a universal joint to be used as the first supporting mechanism 2. In this case, the first arm 13 rotates in a direction along the first plane around one end portion thereof as the rotation center. To this end, a first arm driving unit (here, a first arm motor) that drives the first arm 13 is provided. It is to be noted that, in FIG. 9, reference character A denotes the rotation axis (rotation center) of the first arm 13. The other end portion of the first arm 13 is attached to one end portion of the second arm 14 such that the second arm 14 rotates in the direction along the first plane around the one end portion thereof as the rotation center. To this end, a second arm driving unit (here, a second arm motor) that drives the second arm 14 is provided. It is to be noted that, in FIG. 9, reference character B denotes the rotation axis (rotation center) of the second arm 14. The controller 6 controls the in-plane position and the tilting angle of the tool shaft 1 by controlling the first rotation movement mechanism 4Y (first in-plane movement mechanism 4) and the second parallel movement mechanism 5X (second in-plane movement mechanism 5). Further, the ball screw spline 15 is attached to the other end portion of the second arm 14. Further, the tool shaft 1 is coupled with the end portion of the ball screw spline shaft 15A, which configures the ball screw spline 15, through a constant-velocity joint 2X as the first supporting mechanism 2. In particular, the constant-velocity joint 2X as the first supporting mechanism 2 couples the end portion of the ball screw spline shaft 15A with the end portion of the tool shaft 1. Further, the second arm 14 includes a ball screw nut driving unit that drives the ball screw nut 15B and a ball spline nut driving unit that drives the ball spline nut 15C. Here, the ball screw nut driving unit includes a ball screw nut motor attached to the ball screw nut 15B. Further, the ball spline nut driving unit includes a ball spline nut motor attached to the ball spline nut 15C. The controller 6 controls the rotation and the axial direction position of the tool shaft 1 by controlling the ball screw nut driving unit (here, the ball screw nut motor) and the ball spline nut driving unit (here, the ball spline nut motor). In this case, the controller 6 controls the third table motor 11CB', fourth table motor 11FB', first arm motor, second arm motor, ball screw nut motor and ball spline nut motor. It is to be noted that an encoder capable of detecting the rotational angle of each of the rotation shafts of the third table motor 11CB', fourth table motor 11FB', first arm motor, second arm motor, ball screw nut motor and ball spline nut motor may be provided such that the controller 6 controls the third table motor 11CB', fourth table motor 11FB', first arm motor, second arm motor, ball screw nut motor and ball spline nut motor based on information from the encoders.

In short, the first parallel movement mechanism 4X and the second parallel movement mechanism 5X may be used as the first in-plane movement mechanism 4 and the second in-plane movement mechanism 5, respectively, as in the embodiment described above. Or, the first rotation movement mechanism and the second parallel movement mechanism may be used as the first in-plane movement mechanism 4 and the second in-plane movement mechanism 5, respectively, as in the modification described above. Further, the first parallel movement mechanism and the second rotation movement mechanism may be used as the first in-plane movement mechanism 4 and the second in-plane movement mechanism 5, respectively. Further, the first rotation movement mechanism and the second rotation movement mechanism may be used as the first in-plane movement mechanism 4 and the second in-plane movement mechanism 5, respectively.

Further, while, in the embodiment described above, the tool shaft rotation driving unit 8 that rotates the tool shaft 1 and the axial direction movement mechanism 9 that moves the tool shaft 1 in the axial direction are provided and the controller 6 controls rotation of the tool shaft 1 by controlling the tool shaft rotation driving unit 8 and controls the axial direction position of the tool shaft 1 by controlling the axial direction movement mechanism 9, the manners for the control are not limited to this. For example, as depicting in FIG. 10, a ball screw spline 24 including a ball screw spline shaft 1X, a ball screw nut 20 and a ball spline nut 21 may be used. It is to be noted that the configuration of the other part is similar to that of the embodiment described above. Further, this is referred to as second modification.

In particular, for example, the robot may be configured such that the tool shaft 1 is provided as the ball screw spline shaft 1X and the first supporting mechanism 2 includes one of the ball screw nut 20 and the ball spline nut 21 engaged (fitted) with the ball screw spline shaft 1X and a first nut driving unit 22 that drives one of the ball screw nut 20 and the ball spline nut 21 while the second supporting mechanism 3 includes the other one of the ball screw nut 20 and the ball spline nut 21 and a second nut driving unit 23 that drives the other one of the ball screw nut 20 and the ball spline nut 21. In this case, the first nut driving unit 22 may be configured so as to include a first nut motor 22A attached, for example, to one of the ball screw nut 20 and the ball spline nut 21. Further, the second nut driving unit 23 may be configured so as to include a second nut motor 23A attached, for example, to the other one of the ball screw nut 20 and the ball spline nut 21. Thus, the controller 6 may control the first nut driving unit 22 (here, the first nut motor 22A) and the second nut driving unit 23 (here, the second nut motor 23A). In particular, the controller 6 may control the rotation and the axial direction position of the tool shaft 1 by controlling the first nut driving unit 22 and the second nut driving unit 23. It is to be noted that an encoder capable of detecting each of the rotational angles of the rotation axes of the first nut motor 22A and the second nut motor 23A may be provided such that the controller 6 controls the first nut motor 22A and the second nut motor 23A based on information from the encoders.

It is to be noted that, while, as the ball screw spline shaft 1X, an overlap type ball screw spline shaft on which two kinds of grooves including a helical groove and an axial-direction groove are formed and a coupling type ball screw spline shaft wherein a ball screw shaft and a spline shaft are simply coupled with each other are available, any one of the ball screw spline shafts may be used. While the overlap type ball screw spline shaft is expensive, the ball screw spline shaft has a long stroke and is advantageous in terms of the function. Meanwhile, the coupling type ball screw spline shaft is less expensive.

Figure 12:
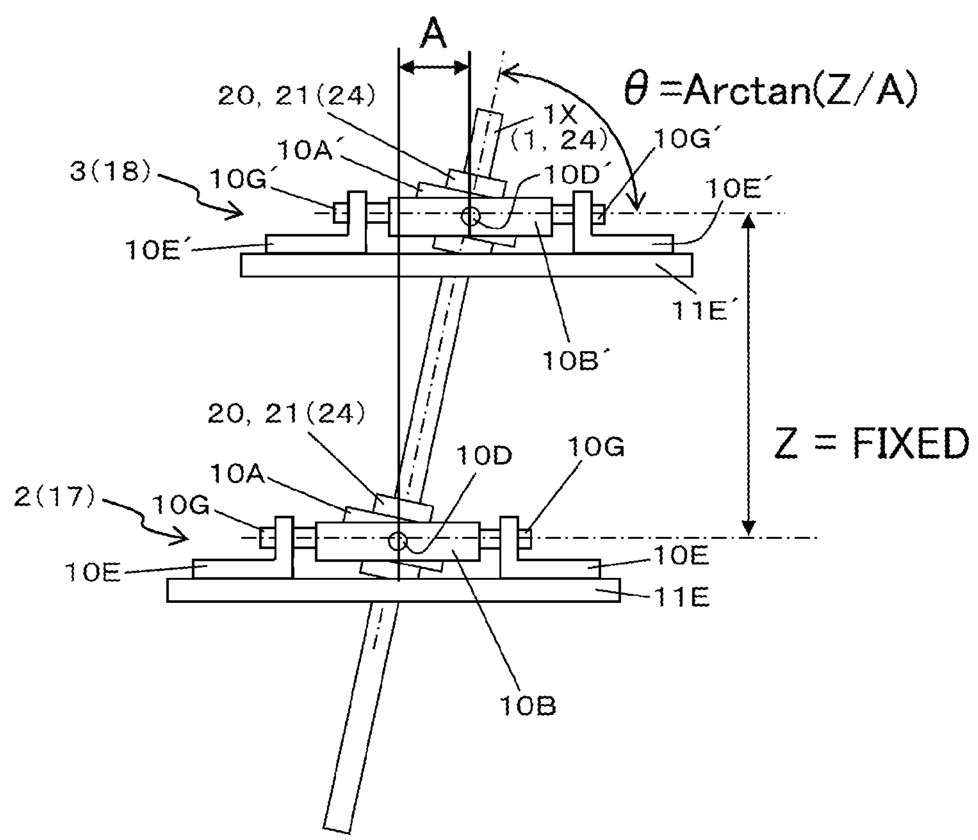
FIG. 12 is a schematic sectional view illustrating a configuration and a behavior of the robot according to the second modification to the present embodiment.

Further, where the ball screw spline 24 is used, the first supporting mechanism 2 is not moved in directions toward and away from the second supporting mechanism 3 in order to move the tool shaft 1 in the axial direction as in the embodiment described above. In particular, where the ball screw spline 24 is used, the tool shaft 1 can be moved in the axial direction without moving the first supporting mechanism 2 in directions toward and away from the second supporting mechanism 3, namely, without changing the distance Z in the Z axis direction between the first supporting mechanism 2 and the second supporting mechanism 3 that support the ball screw spline shaft 1X as the tool shaft 1 at two points, for example, as depicted in FIG. 12. Therefore, by providing one of the ball spline nut 21 and the ball screw nut 20 on the first supporting mechanism 2 and providing the other one of the nuts 20 and 21 on the second supporting mechanism 3 and besides providing the first stage 17 and the second stage 18 in parallel to each other as described above, the distance Z between the first supporting mechanism 2 and the second supporting mechanism 3 in the Z axis direction is fixed in the overall range of movement. In this case, the tilting angle θ of the tool shaft 1 is defined by the distance Z between the first supporting mechanism 2 and the second supporting mechanism 3 in the Z axis direction and the distance (relative distance) A between the first supporting mechanism 2 and the second supporting mechanism 3 in the in-plane direction [$\theta = \mathrm{Arctan}(Z/A)$]. Consequently, posture control for the tool shaft 1 is facilitated. In particular, the tool shaft 1 can be tilted under the same condition at whichever position the tool shaft 1 is placed, and also calculation can be easily performed. On the other hand, if the configuration wherein the first supporting mechanism 2 is moved in the directions toward and away from the second supporting mechanism 3 in order to move the tool shaft 1 in the axial direction as in the embodiment described above, namely, the configuration wherein the first supporting mechanism 2 moves upwardly and downwardly, is adopted, then the tilting angle of the tool shaft 1 depends upon the distance between the first supporting mechanism 2 and the second supporting mechanism 3 in the Z axis direction. Therefore, in the posture control for the tool shaft 1, the distance between the first supporting mechanism 2 and the second supporting mechanism 3 in the Z axis direction is taken into consideration.

Figure 11:
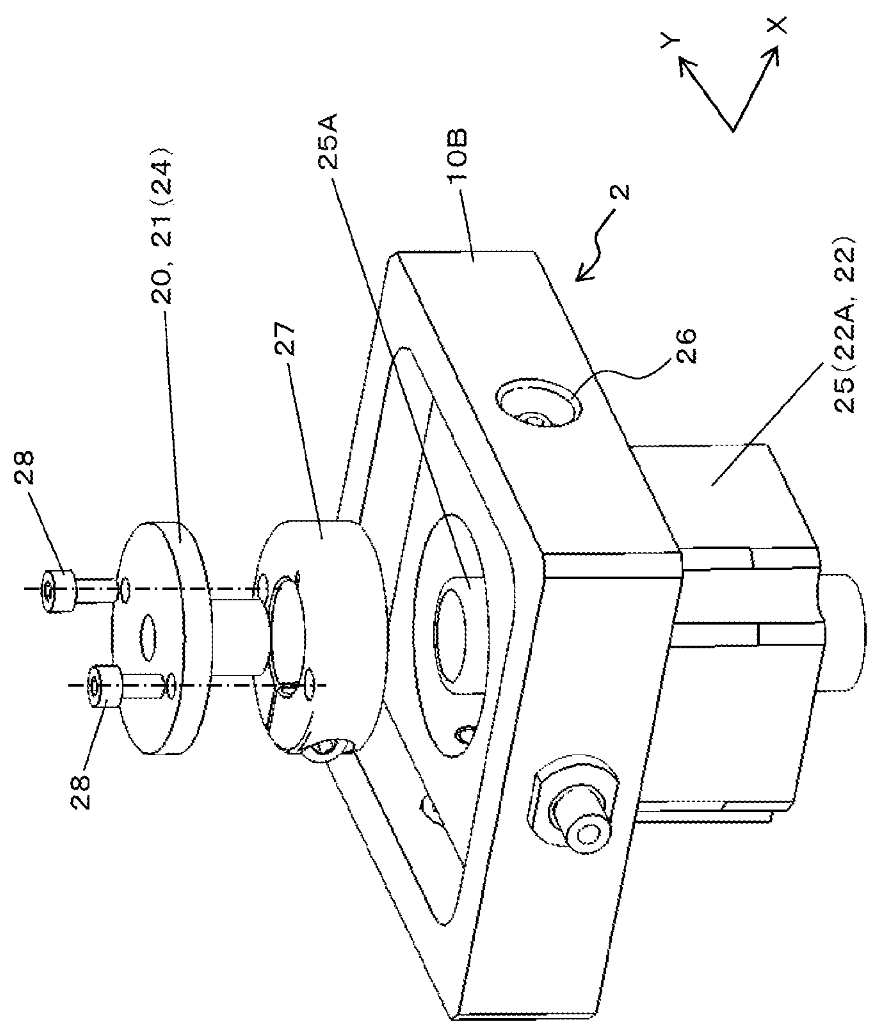
FIG. 11 is a schematic perspective view depicting a configuration of a supporting mechanism that configures the robot according to the second modification to the present embodiment.

Here, as depicted in FIG. 11, a first hollow motor 25 is used as the first nut motor 22A as the first nut driving unit 22 and attached to the universal joint as the first supporting mechanism 2. In particular, in place of the inner side holder 10A, the first hollow motor 25 is rotatably supported through a bearing 26 at the inner side of the outer side holder 10B that configures the universal joint as the first supporting mechanism 2. Here, the first hollow motor 25 is rotatably supported around the X axis on the outer side holder 10B.

Therefore, the tool shaft 1 is rotatably supported around the X axis through the first hollow motor 25. Further, the tool shaft 1 is rotatably supported around the Y axis through the outer side holder 10B and the first hollow motor 25. Similarly as in the case of the embodiment described above, also the universal joint as the first supporting mechanism 2 configured in such a manner as just described is an universal joint that rotatably supports the tool shaft 1 around the two axes orthogonal to the axis in the direction along the tool shaft 1.

Further, a set collar 27 is tightened on the outer periphery of a rotation portion 25A of the first hollow motor 25 here and one of the ball screw nut 20 and the ball spline nut 21 is attached to the set collar 27 by a screw 28. In this manner, one of the ball screw nut 20 and the ball spline nut 21 is attached to the universal joint as the first supporting mechanism 2 through the first hollow motor 25 and is driven to rotate by the first hollow motor 25. Further, one of the ball screw nut 20 and the ball spline nut 21 is engaged with (screwed on or fitted with) the ball screw spline shaft 1X as the tool shaft 1. In this manner, the first supporting mechanism 2 including the first hollow motor 25 and the outer side holder 10B is attached to one portion of the tool shaft 1 through one of the ball screw nut 20 and the ball spline nut 21 and the set collar 27. Thus, the first supporting mechanism 2 supports the tool shaft 1 tiltably and movably in the axial direction. The first supporting mechanism 2 rotatably supports the tool shaft 1 around the two axes (around the X axis and the Y axis) orthogonal to the axis (Z axis) in the direction along the tool shaft 1.

Similarly, a second hollow motor is used as the second nut motor 23A as the second nut driving unit 23 and attached to the universal joint as the second supporting mechanism 3. In particular, in place of the inner side holder 10A', the second hollow motor is rotatably supported through a bearing at the inner side of the outer side holder 10B' that configures the universal joint as the second supporting mechanism 3. Here, the second hollow motor is rotatably supported around the X axis on the outer side holder 10B'. Therefore, the tool shaft 1 is rotatably supported around the X axis through the second hollow motor. Further, the tool shaft 1 is rotatably supported around the Y axis through the outer side holder 10B' and the second hollow motor. Similarly as in the case of the embodiment described above, also the universal joint as the second supporting mechanism 3 configured in such a manner as described above is an universal joint that rotatably supports the tool shaft around the two axes orthogonal to the axis in the direction along the tool shaft 1.

Further, a set collar is tightened on the outer periphery of a rotation portion of the second hollow motor here and the other one of the ball screw nut 20 and the ball spline nut 21 is screwed to the set collar. In this manner, the other one of the ball screw nut 20 and the ball spline nut 21 is attached to the universal joint as the second supporting mechanism 3 through the second hollow motor and is driven to rotate by the second hollow motor. Further, the other one of the ball screw nut 20 and the ball spline nut 21 is engaged with (screwed on or fitted with) the ball screw spline shaft 1X as the tool shaft 1. In this manner, the second supporting mechanism 3 including the second hollow motor and the outer side holder 10B' is attached to the other portion of the tool shaft 1 through the other one of the ball screw nut 20 and ball spline nut 21 and the set collar, and the second supporting mechanism 3 supports the tool shaft 1 tiltably and movably in the axial direction. The second supporting mechanism 3 rotatably supports the tool shaft 1 around the two axes (around the X axis and the Y axis) orthogonal to the axis (Z axis) in the direction along the tool shaft 1.

Figure 10:
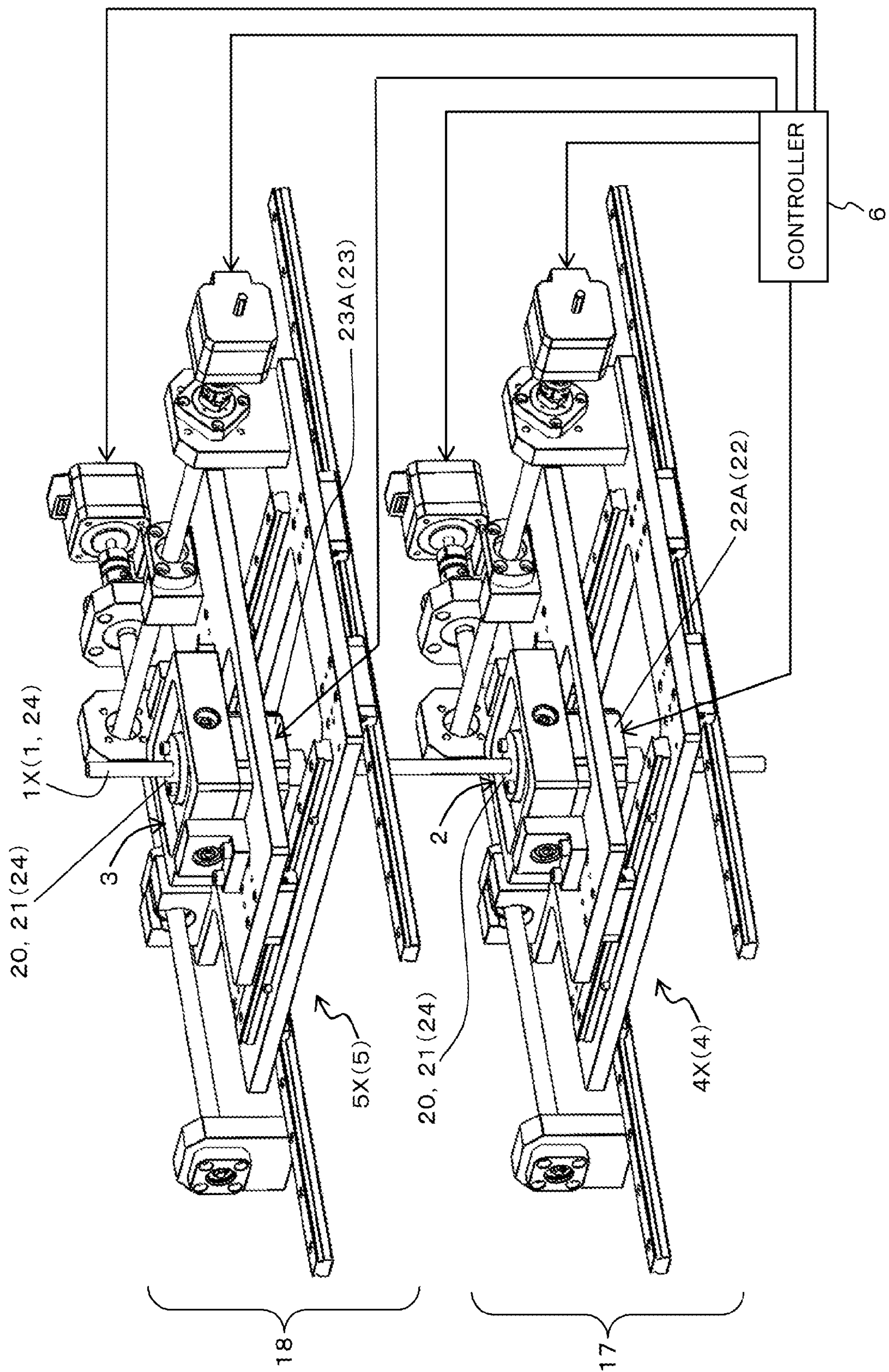
FIG. 10 is a schematic perspective view depicting a configuration of a robot according to a second modification to the present embodiment.

Further, as depicted in FIG. 10, the ball screw spline shaft 1X as the tool shaft 1 extends through the first hollow motor 25 and the second hollow motor, and by combining and rotating one and the other one of the ball screw nut 20 and the ball spline nut 21, the ball screw spline shaft 1X can rotate and move in the axial direction (upwardly and downwardly). Further, by controlling the first nut motor 22A as the first nut driving unit 22 and the second nut motor 23A as the second nut driving unit 23 by the controller 6, rotation and the axial direction position of the ball screw spline shaft 1X as the tool shaft 1 are controlled. Here, by controlling the first nut motor 22A by the controller 6, one of the ball screw nut 20 and the ball spline nut 21 is driven to rotate and rotation and the axial direction position of the ball screw spline shaft 1X as the tool shaft 1 are controlled. For example, the controller 6 can control the axial direction position of the ball screw spline shaft 1X as the tool shaft 1 by operating the first nut motor 22A or the second nut motor 23A to rotate the ball screw nut 20 without rotating the ball spline nut 21. In this case, the ball spline nut 21 functions as a rotation stop mechanism. Further, for example, the controller 6 can control the rotation of the ball screw spline shaft 1X as the tool shaft 1 by operating the first nut motor 22A or the second nut motor 23A to rotate the ball spline nut 21 without rotating the ball screw nut 20.

It is to be noted that, since the ball spline nut 21 constraints only the direction of rotation, where the ball screw nut 20 is fixed, even if the ball spline nut 21 moves in the axial direction of the ball screw spline shaft 1X, the ball screw spline shaft 1X neither moves in the axial direction nor rotates. Conversely, where the ball spline nut 21 is fixed, if the ball screw nut 20 moves in the axial direction of the ball screw spline shaft 1X, then the ball screw spline shaft 1X moves in synchronism with the ball screw nut 20. In this manner, the axial direction position (position in the upward and downward direction) of the ball screw spline shaft 1X is determined by the movement of the ball screw nut 20, but the movement of the ball spline nut 21 does not have an influence on the axial direction position of the ball spline shaft 1X. Therefore, also where the distance between the two supporting mechanisms (universal joints) 2 and 3 varies as in the robot of the embodiment described above, the ball screw spline 24 can be used. In particular, by attaching the ball spline nut 21 and the ball screw nut 20 to the two supporting mechanisms (universal joints) 2 and 3, respectively, the movement in the axial direction and the rotation of the ball screw spline shaft 1X as the tool shaft 1 can be implemented. Further, one and the other one of the ball screw nut 20 and the ball spline nut 21 may be provided on the first supporting mechanism 2 and the second supporting mechanism 3, respectively, as described above, and the nuts 20 and 21 may be provided at any one side of the two supporting mechanisms 2 and 3. However, since the ball screw nut 20 side is made the reference, it is preferable to solidly configure one of the supporting mechanisms (universal joints) 2 and 3 on which the ball screw nut 20 is to be provided.

It is to be noted here that, while the case in which the first rotation movement mechanism or the second rotation movement mechanism is used (first modification and the case in which the ball screw spline is used (second modification) are described separately as the modifications to the embodiment described above, also it is possible to combine the modifications.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A robot, comprising:

a tool shaft;

a first supporting mechanism attached to one portion of the tool shaft and tiltably supporting the tool shaft;

a second supporting mechanism attached to a different portion of the tool shaft and tiltably supporting the tool shaft;

a first in-plane movement mechanism that moves the first supporting mechanism in a first plane;

a second in-plane movement mechanism that moves the second supporting mechanism in a second plane; and a controller that controls an in-plane position and an inclination angle of the tool shaft by controlling the first in-plane movement mechanism and the second in-plane movement mechanism; and wherein the first supporting mechanism or the second supporting mechanism supports the tool shaft movably in an axial direction;

the controller, by controlling the first in-plane movement mechanism and the second in-plane movement mechanism, separately moves the first supporting mechanism and the second supporting mechanism, and displaces the positions of the first supporting mechanism and the second supporting mechanism to tilt the tool shaft.

2. The robot according to claim 1, wherein the first plane and the second plane extend in parallel to each other.

3. The robot according to claim 1, wherein the first supporting mechanism is a universal joint that supports the tool shaft rotatably around two axes orthogonal to an axis extending in a direction along the tool shaft;

the second supporting mechanism is a universal joint that supports the tool shaft rotatably around two axes orthogonal to the axis extending in the direction along the tool shaft; and the first supporting mechanism or the second supporting mechanism is the universal joint that includes a slider capable of sliding the tool shaft in the axial direction.

4. The robot according to claim 1, wherein the first in-plane movement mechanism is a first parallel movement mechanism that parallel moves the first supporting mechanism in the first plane or a first rotation movement mechanism that rotationally moves the first supporting mechanism in the first plane;

the second in-plane movement mechanism is a second parallel movement mechanism that parallel moves the second supporting mechanism in the second plane or a second rotation movement mechanism that rotationally moves the second supporting mechanism in the second plane.

5. The robot according to claim 4, wherein the first parallel movement mechanism includes a first rail extending in one direction along the first plane, a first table that moves parallel along the first rail, a first table driving unit that drives the first table, a second rail provided on the first table and extending in the other direction orthogonal to the one direction along the first plane, a second table that moves parallel along the second rail, and a second table driving unit that drives the second table, and the first supporting mechanism is provided on the second table; and the second parallel movement mechanism includes a third rail extending in one direction along the second plane, a third table that moves parallel along the third rail, a third table driving unit that drives the third table, a fourth rail provided on the third table and extending in the other direction orthogonal to the one direction along the second plane, a fourth table that moves parallel along the fourth rail, and a fourth table driving unit that drives the fourth table, and the second supporting mechanism is provided on the fourth table.

6. The robot according to claim 5, wherein the first table driving unit includes a first table ball screw attached to the first table and a first table motor that drives the first table ball screw;

the second table driving unit includes a second table ball screw attached to the second table and a second table motor that drives the second table ball screw;

the third table driving unit includes a third table ball screw attached to the third table and a third table motor that drives the third table ball screw; and the fourth table driving unit includes a fourth table ball screw attached to the fourth table and a fourth table motor that drives the fourth table ball screw.

7. The robot according to claim 4, wherein the first rotation movement mechanism includes a first arm that rotates in a direction along the first plane around one end portion thereof as a rotation center, a first arm driving unit that drives the first arm, a second arm that has one end portion to which the other end portion of the first arm is attached and rotates in a direction along the first plane around the one end portion thereof as a rotation center, and a second arm driving unit that drives the second arm, and the first supporting mechanism is provided at the other end portion of the second arm; and the second rotation movement mechanism includes a third arm that rotates in a direction along the second plane around one end portion thereof as a rotation center, a third arm driving unit that drives the third arm, a fourth arm that has one end portion to which the other end portion of the third arm is attached and rotates in a direction along the second plane around the one end portion thereof as a rotation center, and a fourth arm driving unit that drives the fourth arm, and the second supporting mechanism is provided at the other end portion of the fourth arm.

8. The robot according to claim 7, wherein the first arm driving unit includes a first arm motor attached to the one end portion of the first arm;

the second arm driving unit includes a second arm motor attached to the one end portion of the second arm;

the third arm driving unit includes a third arm motor attached to the one end portion of the third arm; and the fourth arm driving unit includes a fourth arm motor attached to the one end portion of the fourth arm.

9. The robot according to claim 1, further comprising:

a tool shaft rotation driving unit that rotates the tool shaft; wherein the first supporting mechanism and the second supporting mechanism rotatably support the tool shaft; and the controller controls rotation of the tool shaft by controlling the tool shaft rotation driving unit.

10. The robot according to claim 9, wherein the tool shaft rotation driving unit includes a tool shaft motor attached to an end portion of the tool shaft.

11. The robot according to claim 1, further comprising:
an axial direction movement mechanism that moves the tool shaft in an axial direction; wherein
the controller controls an axial direction position of the tool shaft by controlling the axial direction movement mechanism.

12. The robot according to claim 11, wherein the axial direction movement mechanism includes a guide that moves the first supporting mechanism or the second supporting mechanism in a direction in which the first supporting mechanism and the second supporting mechanism move toward and away from each other, and a guide driving unit that drives the guide.

13. The robot according to claim 12, wherein the guide driving unit includes a guide ball screw attached to the guide, and a guide motor that drives the guide ball screw.

14. The robot according to claim 7, wherein the second arm includes, at the other end portion thereof, a ball screw spline including a ball screw spline shaft, a ball screw nut and a ball spline nut, and the robot further comprises a ball screw nut driving unit that drives the ball screw nut and a ball spline nut driving unit that drives the ball spline nut;
the first supporting mechanism is a constant velocity joint that couples an end portion of the ball screw spline shaft with an end portion of the tool shaft; and
the controller controls rotation and an axial direction position of the tool shaft by controlling the ball screw nut driving unit and the ball spline nut driving unit.

15. The robot according to claim 14, wherein the ball screw nut driving unit includes a ball screw nut motor attached to the ball screw nut; and
the ball spline nut driving unit includes a ball spline nut motor attached to the ball spline nut.

16. The robot according to claim 1, wherein the tool shaft is a ball screw spline shaft;
the first supporting mechanism includes one of a ball screw nut and a ball spline nut engaging with the ball screw spline shaft, and a first nut driving unit that drives one of the ball screw nut and the ball spline nut;
the second supporting mechanism includes the other one of the ball screw nut and the ball spline nut, and a second nut driving unit that drives the other one of the ball screw nut and the ball spline nut; and
the controller controls rotation and the axial direction position of the tool shaft by controlling the first nut driving unit and the second nut driving unit.

17. The robot according to claim 16, wherein the first nut driving unit includes a first nut motor attached to one of the ball screw nut and the ball spline nut; and
the second nut driving unit includes a second nut motor attached to the other one of the ball screw nut and the ball spline nut.

* * * * *